US010379335B2

(12) United States Patent
Iguchi

(10) Patent No.: US 10,379,335 B2
(45) Date of Patent: Aug. 13, 2019

(54) ILLUMINATION SETTING METHOD, LIGHT SHEET MICROSCOPE APPARATUS, AND RECORDING MEDIUM

(71) Applicant: OLYMPUS CORPORATION, Hachioji-shi, Tokyo (JP)

(72) Inventor: Yoshihito Iguchi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/495,294

(22) Filed: Apr. 24, 2017

(65) Prior Publication Data

US 2017/0322408 A1 Nov. 9, 2017

(30) Foreign Application Priority Data

May 9, 2016 (JP) ................................ 2016-094159

(51) Int. Cl.

| | |
|---|---|
| ***G06K 9/46*** | (2006.01) |
| ***G06K 9/62*** | (2006.01) |
| ***G02B 21/00*** | (2006.01) |
| ***G02B 21/06*** | (2006.01) |
| ***G02B 21/16*** | (2006.01) |
| ***G02B 21/36*** | (2006.01) |

(52) U.S. Cl.

CPC ......... *G02B 21/365* (2013.01); *G02B 21/002* (2013.01); *G02B 21/0032* (2013.01); *G02B 21/0076* (2013.01); *G02B 21/06* (2013.01); *G02B 21/16* (2013.01); *G02B 21/367* (2013.01); *G06K 9/4661* (2013.01); *G06K 9/6202* (2013.01)

(58) Field of Classification Search

CPC .. G02B 21/365; G02B 21/367; G02B 21/002; G02B 21/0032; G02B 21/0076; G02B 21/06; G02B 21/16; G06K 9/4661; G06K 9/6202

See application file for complete search history.

(56) References Cited

U.S. PATENT DOCUMENTS

| | | | | |
|---|---|---|---|---|
| 5,579,108 A * | 11/1996 | See | G01B 11/26 | 356/450 |
| 7,787,179 B2 * | 8/2010 | Lippert | G02B 21/06 | 359/385 |
| 8,350,230 B2 * | 1/2013 | Power | G02B 21/008 | 250/459.1 |
| 8,362,448 B2 * | 1/2013 | Wolleschensky | G01N 21/6458 | 250/458.1 |
| 8,744,213 B2 * | 6/2014 | Tatke | G02B 21/365 | 342/176 |
| 9,404,739 B2 * | 8/2016 | Nakatsukasa | G01B 11/24 | |
| 9,423,356 B2 * | 8/2016 | Ogawa | G01N 21/9501 | |
| 9,645,378 B2 * | 5/2017 | Hilbert | G02B 21/002 | |
| 9,880,378 B2 * | 1/2018 | Taniguchi | G02B 21/24 | |

(Continued)

FOREIGN PATENT DOCUMENTS

JP 2008250303 A 10/2008

*Primary Examiner* — James R Sheleheda

(74) *Attorney, Agent, or Firm* — Holtz, Holtz & Volek PC

(57) ABSTRACT

An illumination setting method includes acquiring an image of a sample onto which a light sheet has been radiated; determining, on the basis of the acquired image of the sample, a subordinate ray angle with respect to a width direction of the light sheet; and performing a setting of the illumination optical system according to the determined subordinate ray angle.

18 Claims, 27 Drawing Sheets

(56) References Cited

U.S. PATENT DOCUMENTS

| | | | | |
|---|---|---|---|---|
| 10,007,100 | B2 * | 6/2018 | Kikuchi | G02B 21/0048 |
| 10,018,819 | B2 * | 7/2018 | Iguchi | G02B 21/06 |
| 10,042,148 | B2 * | 8/2018 | Iguchi | G02B 21/006 |
| 2007/0109633 | A1 * | 5/2007 | Stelzer | G02B 21/06 359/385 |
| 2009/0237765 | A1 | 9/2009 | Lippert et al. | |
| 2010/0201784 | A1 * | 8/2010 | Lippert | G02B 21/002 348/46 |
| 2010/0265575 | A1 * | 10/2010 | Lippert | G02B 21/16 359/385 |
| 2010/0309548 | A1 * | 12/2010 | Power | G02B 21/008 359/385 |
| 2011/0115895 | A1 * | 5/2011 | Huisken | G02B 21/0048 348/79 |
| 2011/0304723 | A1 * | 12/2011 | Betzig | G02B 21/002 348/79 |
| 2012/0206798 | A1 * | 8/2012 | Knop | G02B 21/002 359/385 |
| 2013/0094755 | A1 * | 4/2013 | Lippert | G02B 21/002 382/154 |
| 2014/0376078 | A1 * | 12/2014 | Shimada | G02B 21/0036 359/285 |
| 2015/0070757 | A1 * | 3/2015 | Lippert | G02B 21/16 359/385 |
| 2015/0253560 | A1 * | 9/2015 | Otte | G02B 21/0032 359/385 |
| 2015/0309294 | A1 * | 10/2015 | Stelzer | G02B 21/06 359/370 |
| 2015/0338628 | A1 * | 11/2015 | Knebel | G02B 21/002 250/208.1 |
| 2015/0362713 | A1 * | 12/2015 | Betzig | G02B 21/0064 250/459.1 |
| 2016/0124201 | A1 * | 5/2016 | Kikuchi | G02B 21/16 359/385 |
| 2016/0124203 | A1 * | 5/2016 | Ryu | G02B 21/06 348/79 |
| 2016/0305883 | A1 * | 10/2016 | Betzig | G02B 21/16 |
| 2016/0306154 | A1 * | 10/2016 | Iguchi | G02B 21/06 |
| 2016/0327779 | A1 * | 11/2016 | Hillman | G02B 21/367 |
| 2016/0363752 | A1 * | 12/2016 | Mizunaka | G02B 21/18 |
| 2017/0131534 | A1 * | 5/2017 | Lippert | G02B 21/06 |
| 2017/0139193 | A1 * | 5/2017 | Iguchi | G02B 21/006 |
| 2017/0299510 | A1 * | 10/2017 | Acikalin | G01N 21/53 |
| 2017/0322408 | A1 * | 11/2017 | Iguchi | G02B 21/002 |
| 2018/0045941 | A1 * | 2/2018 | Gao | G02B 21/06 |
| 2018/0088304 | A1 * | 3/2018 | Stelzer | G02B 21/06 |
| 2018/0088305 | A1 * | 3/2018 | Itoh | G02B 26/0808 |
| 2018/0120548 | A1 * | 5/2018 | Fahrbach | G02B 21/002 |
| 2018/0149854 | A1 * | 5/2018 | Siebenmorgen | G02B 21/082 |
| 2018/0203217 | A1 * | 7/2018 | Knebel | G02B 21/006 |

* cited by examiner

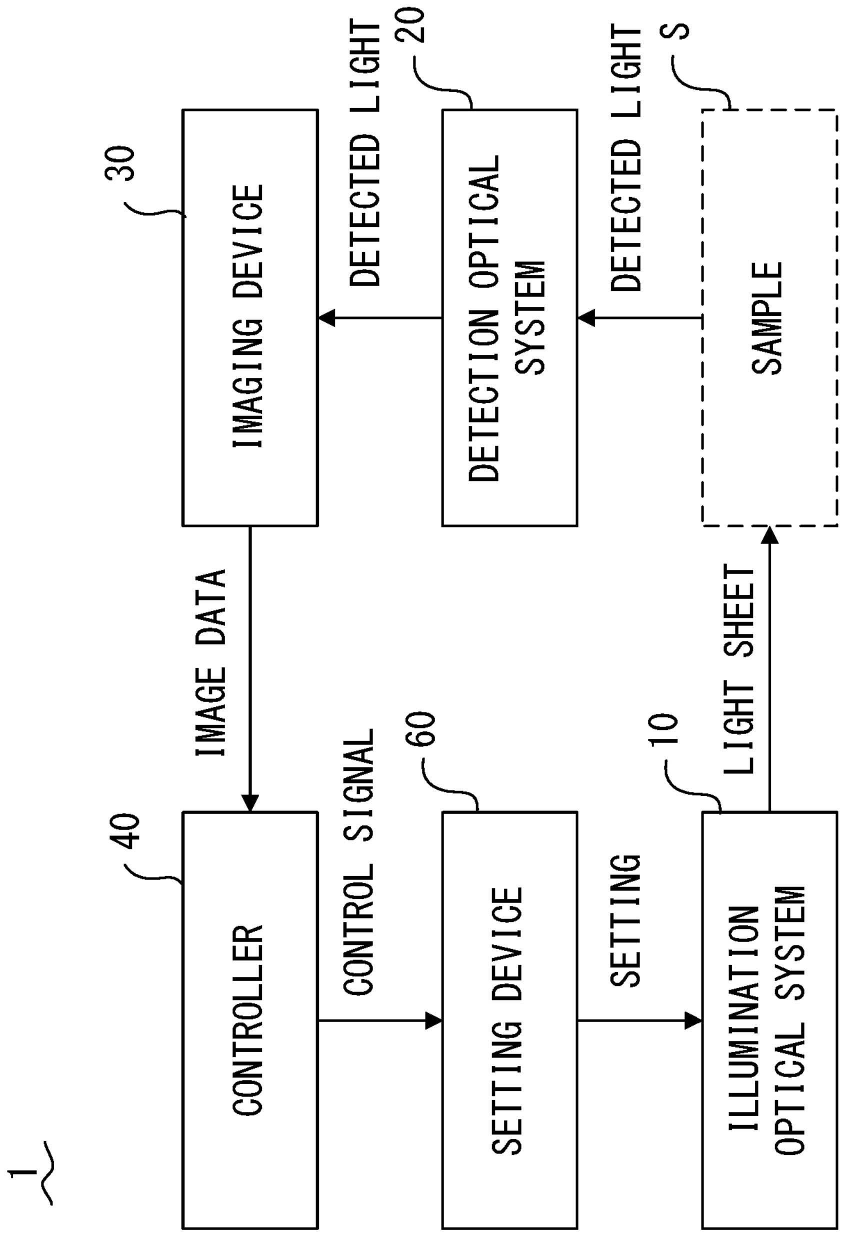
F I G. 1

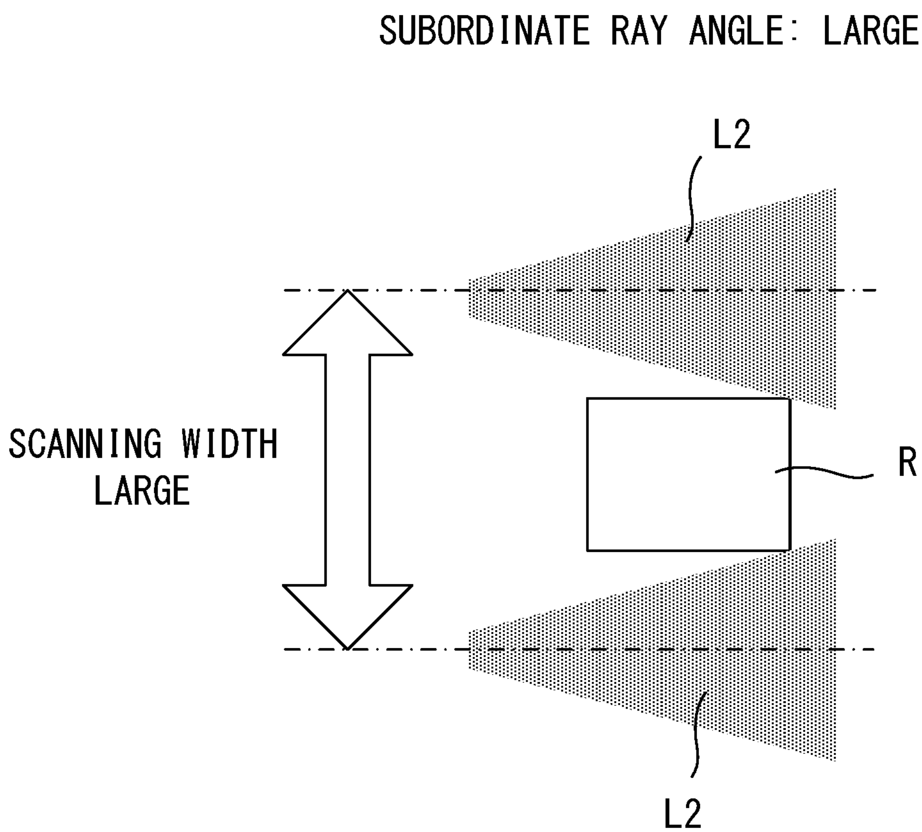
F I G. 4

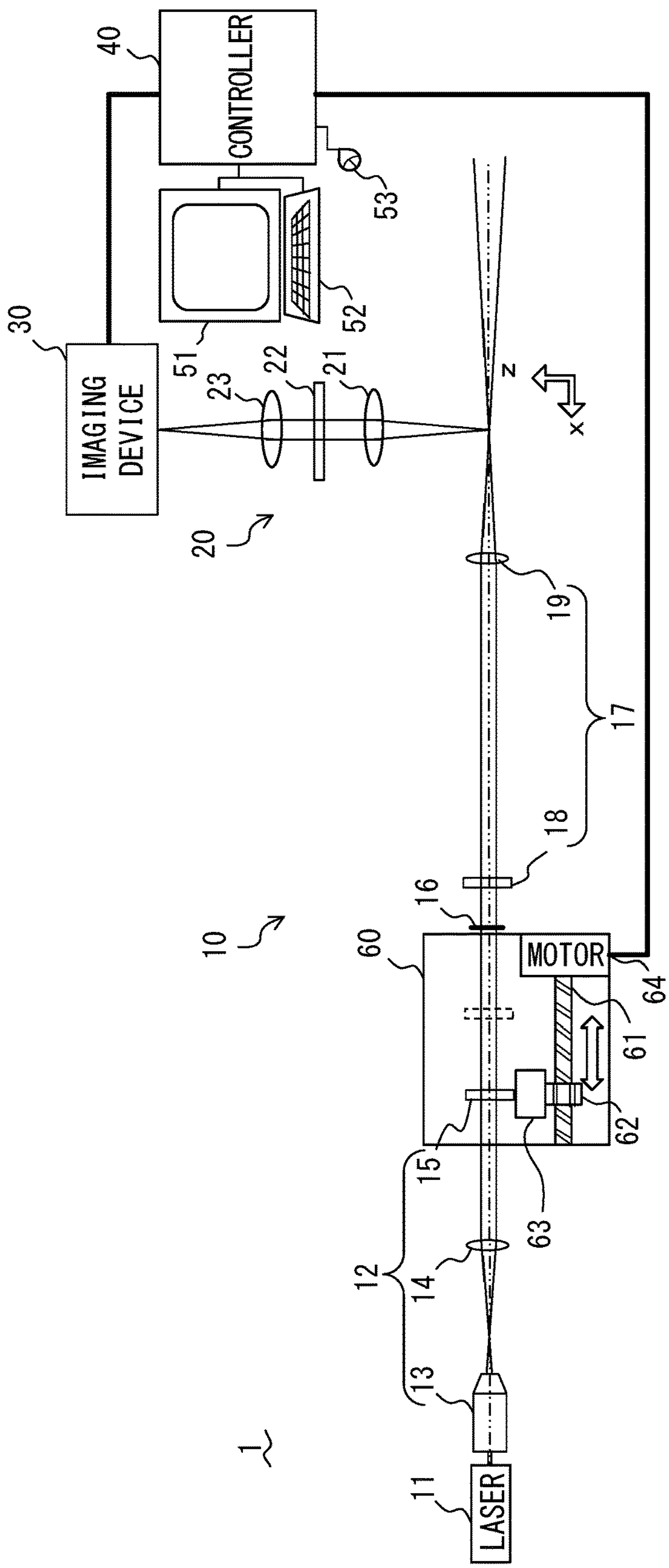
F I G. 5 B

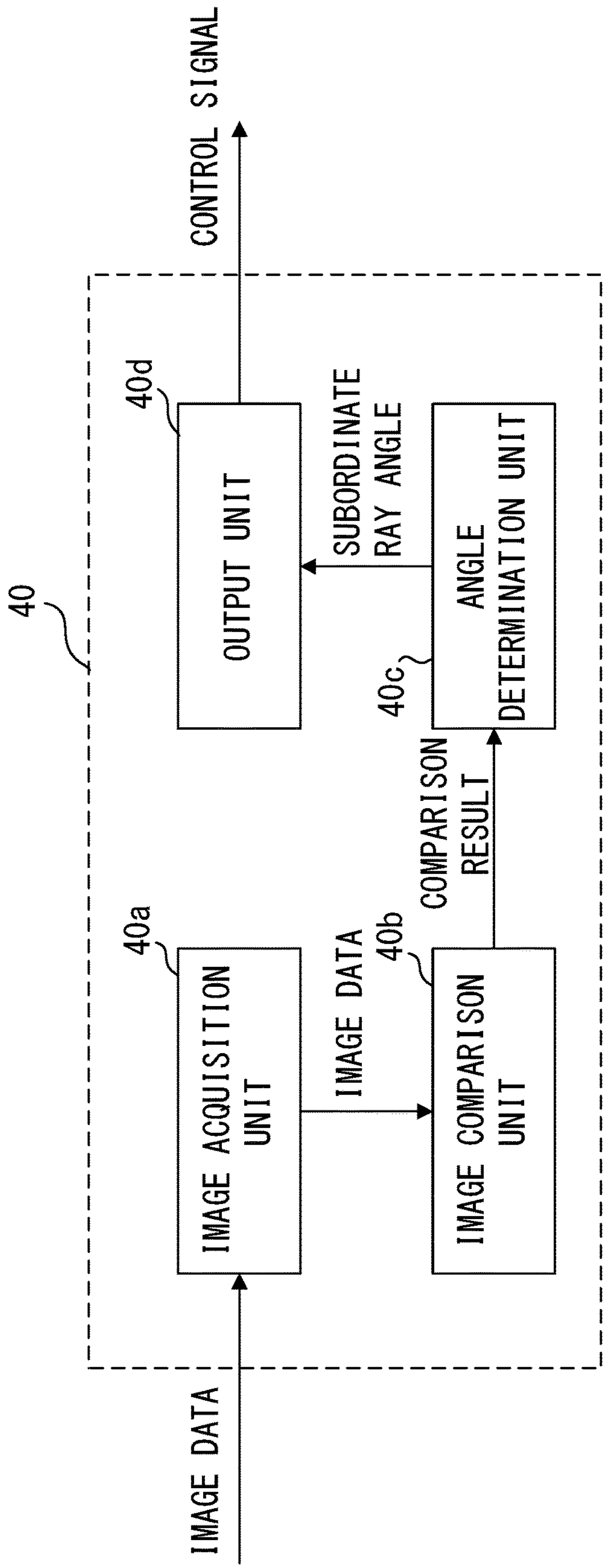
F I G. 7

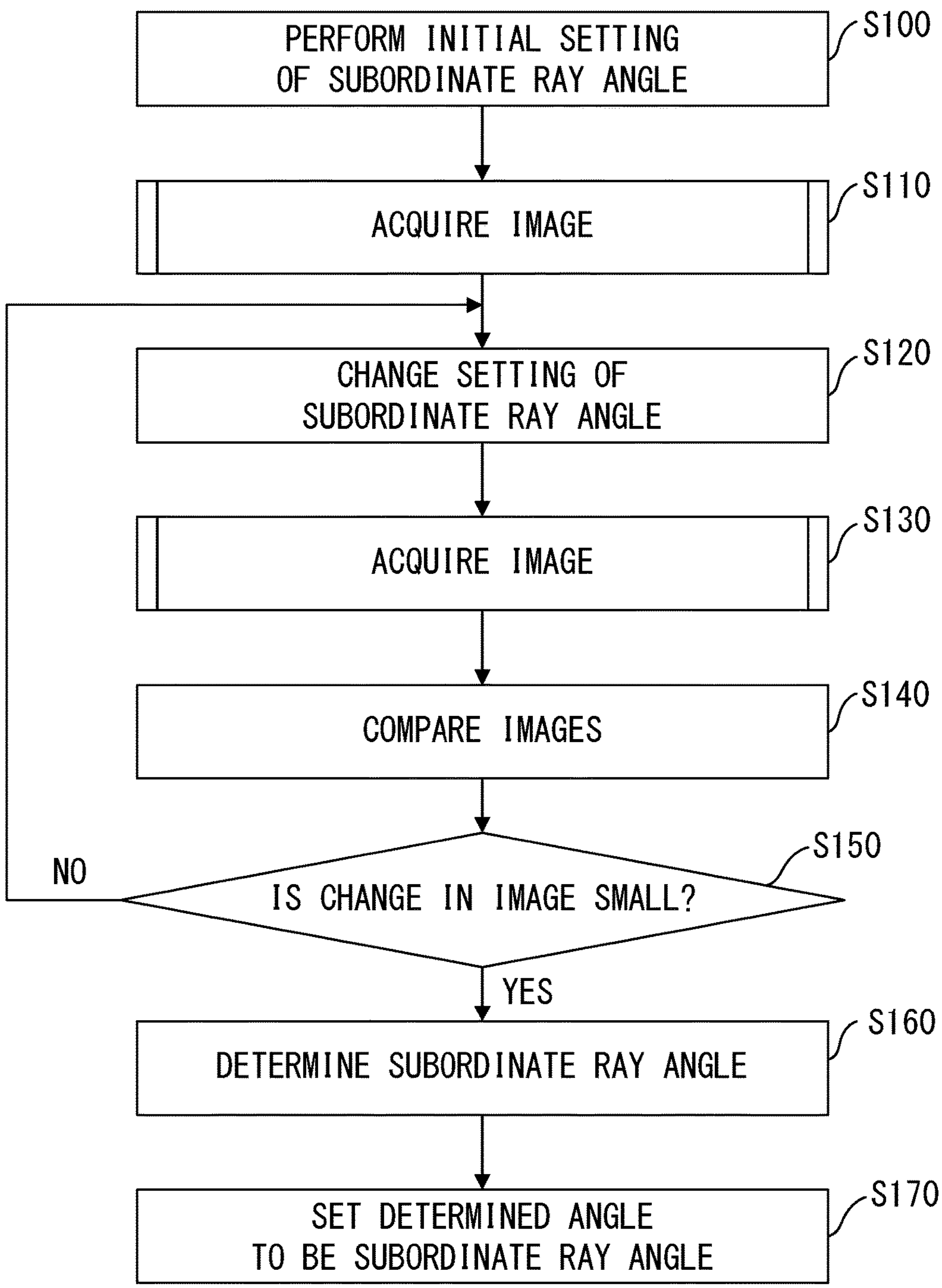
F I G. 8

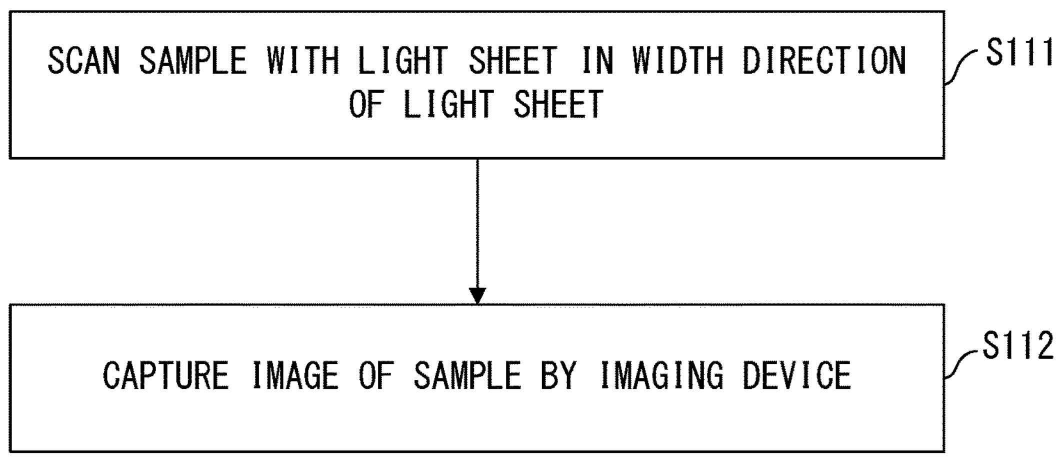
F I G. 9

ILLUMINATION SETTING METHOD, LIGHT SHEET MICROSCOPE APPARATUS, AND RECORDING MEDIUM

CROSS REFERENCE TO RELATED APPLICATIONS

This application is based upon and claims the benefit of priority from prior Japanese Patent Application No. 2016-094159, filed May 9, 2016, the entire contents of which are incorporated herein by this reference.

BACKGROUND OF THE INVENTION

Field of the Invention

The present invention relates to an illumination setting method, a light sheet microscope apparatus, and a recording medium.

Description of the Related Art

In the field of fluorescence microscopy, a technology is known that radiates a sample with a laser beam from a direction perpendicular to an optical axis of a detection optical system, so as to form, in the sample, a light sheet perpendicular to the optical axis of the detection optical system. This technology has been attracting attention in recent years because it provides the advantages of, for example, suppressing damage caused to a sample and realizing a high longitudinal resolution.

When the above-described technology is applied, a sample is illuminated from a direction different from a direction of the optical axis of the detection optical system. Thus, if the sample has a portion through which light cannot be easily transmitted due to absorption or a portion in which light is scattered (hereinafter collectively referred to as a light-blocking portion), light will not enter behind the light-blocking portion, and then a striped shadow will be created in the field of view.

A related technology is disclosed in, for example, Japanese Laid-open Patent Publication No. 2008-250303. Japanese Laid-open Patent Publication No. 2008-250303 discloses a technology that radiates a sample material with a radiation component of a sheet light at different angles according to the time by use of an oscillatory movement of a wobble plate or a swing mirror.

SUMMARY OF THE INVENTION

An illumination setting method according to an aspect of the present invention includes acquiring an image of a sample onto which a light sheet emitted from an illumination optical system has been radiated; determining, on the basis of the acquired image of the sample, a subordinate ray angle with respect to a width direction of the light sheet emitted from the illumination optical system; and performing a setting of the illumination optical system according to the determined subordinate ray angle.

An illumination setting method according to another aspect of the present invention includes acquiring an image of a sample onto which a light sheet has been radiated by an illumination optical system; determining, on the basis of the acquired image of the sample, an incident angle at which a principal ray of the light sheet emitted from the illumination optical system enters the sample; and performing at least one of a setting of the illumination optical system and a setting of a direction of the sample according to the determined incident angle.

An illumination setting method according to yet another aspect of the present invention includes acquiring, by a computer and from an imaging device, an image of a sample onto which a light sheet has been radiated by an illumination optical system; determining, by the computer and on the basis of the image of the sample that has been acquired from the imaging device, a subordinate ray angle with respect to a width direction of the light sheet emitted from the illumination optical system; and outputting, by the computer, a control signal that gives an instruction to perform a setting of the illumination optical system that corresponds to the determined subordinate ray angle.

A light sheet microscope apparatus according to yet another aspect of the present invention includes an illumination optical system that radiates a light sheet onto a sample; an imaging device that acquires an image of the sample onto which the light sheet has been radiated by the illumination optical system; a controller that determines, on the basis of the image of the sample that has been acquired by the imaging device, a subordinate ray angle with respect to a width direction of the light sheet emitted from the illumination optical system; and a setting device that performs a setting of the illumination optical system according to the subordinate ray angle determined by the controller.

A non-transitory recording medium according to yet another aspect of the present invention has stored therein a program that causes a computer to execute a process including acquiring, from an imaging device, an image of a sample onto which a light sheet has been radiated by an illumination optical system; determining, on the basis of the image of the sample that has been acquired from the imaging device, a subordinate ray angle with respect to a width direction of the light sheet emitted from the illumination optical system; and outputting a control signal that gives an instruction to perform a setting of the illumination optical system that corresponds to the determined subordinate ray angle.

BRIEF DESCRIPTION OF THE DRAWINGS

The present invention will be more apparent from the following detailed description when the accompanying drawings are referenced.

FIG. 1 illustrates a schematic configuration of a light sheet microscope apparatus according to a first embodiment;

FIG. 4 illustrates a scanning range when a light sheet having a large subordinate ray angle is radiated;

FIG. 5B illustrates the light sheet microscope apparatus according to the first embodiment and the illumination beam, as viewed from a width direction of the light sheet;

FIG. 7 illustrates a functional configuration of the controller according to the first embodiment;

FIG. 8 is a flowchart that illustrates a procedure of illumination setting processing according to the first embodiment;

FIG. 9 is a flowchart that illustrates a procedure of image acquisition processing according to the first embodiment;

DESCRIPTION OF THE EMBODIMENTS

Figure 2:
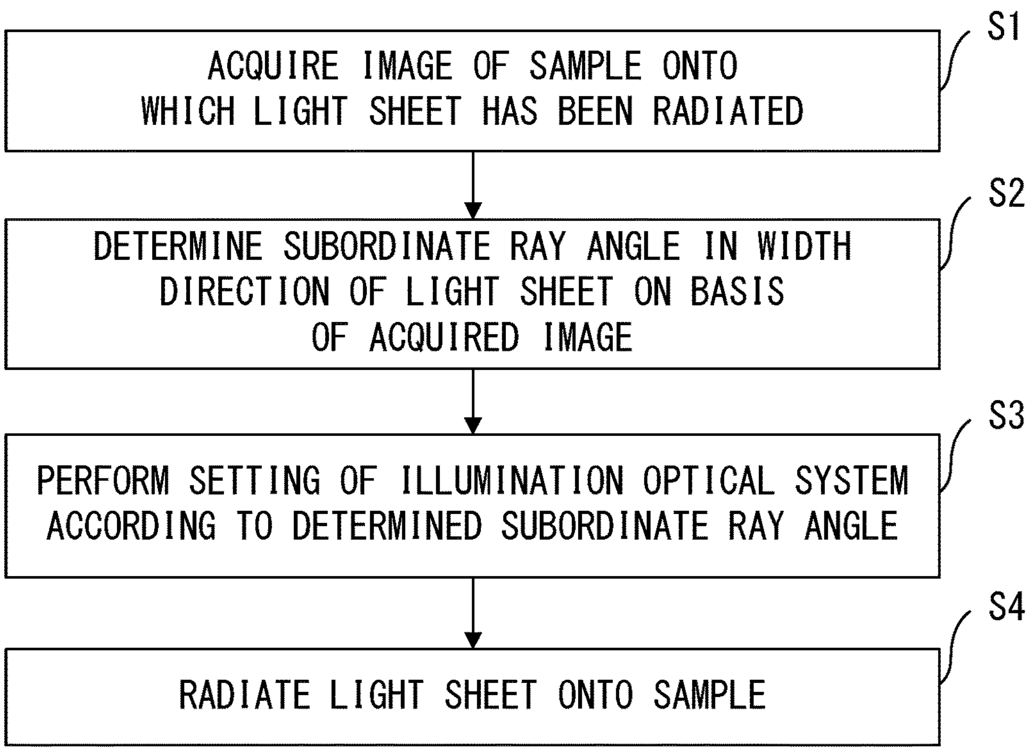
FIG. 2 is a flowchart that illustrates a procedure of illumination processing according to the first embodiment.

An illumination setting that can suppress a stripe effectively differs according to the size of a material causing the stripe (that is, the size of a light-blocking portion). With respect to an effect that suppresses a stripe (hereinafter referred to as a stripe eliminating effect), it is preferable that the illumination setting be performed such that a sample is illuminated at a larger angle if there exists a larger causative material. On the other hand, the illumination setting also inevitably affects a basic illumination performance. For example, there tends to be a greater decrease in, for example, illumination efficiency or uniformity of illumination if a sample is illuminated at a larger angle. Thus, it is preferable that an appropriate illumination setting be performed according to an observation target while balancing an illumination performance and a stripe eliminating effect.

In light of the description above, embodiments of the present invention will now be described.

First Embodiment

FIG. 1 illustrates a schematic configuration of a light sheet microscope apparatus 1 according to a first embodiment. The light sheet microscope apparatus 1 is, for example, a fluorescence microscope that detects a fluorescence from a sample S such as a biological sample. The light sheet microscope apparatus 1 is configured to illuminate the sample S with a light sheet.

The light sheet microscope apparatus 1 includes an illumination optical system 10 that radiates a light sheet onto the sample S, a detection optical system 20 that guides, to an imaging device 30, detected light (such as a fluorescence) from the sample S, and the imaging device 30 that acquires an image of the sample S. The light sheet microscope apparatus 1 further includes a controller 40 that controls the light sheet microscope apparatus 1, and a setting device 60 that performs a setting of the illumination optical system 10. The sample S is arranged around a position at which an optical axis of the illumination optical system 10 and an optical axis of the detection optical system 20 intersect.

The illumination optical system 10 is configured to form a light sheet having a sheet shape substantially perpendicular to the optical axis of the detection optical system 20 and to radiate the light sheet onto the sample S from a direction substantially perpendicular to the optical axis of the detection optical system 20. The illumination optical system 10 will be described in detail later.

Here, the light sheet is illumination light that forms an illuminated area having a sheet shape. The sheet shape is a shape in which a cross-section of illumination light (hereinafter referred to as a beam cross-section) that is perpendicular to a traveling direction of the illumination light (an optical-axis direction on the exit side of the illumination optical system 10) has a two-dimensional shape that has two directions perpendicular to each other, wherein one of the two directions is long and the other is short. In the following description, the long direction in the beam cross-section is referred to as a width direction of a light sheet, and the short direction is referred to as a thickness direction of the light sheet. Further, the sheet shape substantially perpendicular to the optical axis of the detection optical system 20 is a sheet shape in which a light sheet surface that is defined by the traveling direction and the width direction is substantially perpendicular to the optical axis of the detection optical system 20. Being substantially perpendicular includes a perpendicular state from which a person skilled in the art can recognize a setting error or a manufacturing error. In the present embodiment, the traveling direction is defined as an x-axis direction, the width direction is defined as a y-axis direction, and the thickness direction is defined as a z-axis direction. The same applies to the other embodiments with respect to this point.

The detection optical system 20 is an optical system that collects light (such as a fluorescence and hereinafter referred to as detected light) from the sample S and forms an optical image of the sample S on a light-receiving surface of the imaging device 30. The imaging device 30 is a digital camera that includes a two-dimensional image sensor such as a CCD (charge coupled device) or a CMOS (complementary metal oxide semiconductor). The imaging device 30 acquires an image of the sample S onto which a light sheet has been radiated by the illumination optical system 10 and outputs image data of the sample S to the controller 40.

The controller 40 is a microscope controller that controls the light sheet microscope apparatus 1. The controller 40 is configured to output a control signal to various electrical mechanisms provided in a microscope body of the light sheet microscope apparatus 1. The setting device 60 is one of the electrical mechanisms, in the microscope body, which operate according to the control signal from the controller 40, and is a device that performs a setting of the illumination optical system 10.

FIG. 2 is a flowchart that illustrates a procedure of illumination processing according to the first embodiment. The illumination processing performed by the light sheet microscope apparatus 1 is generally described with reference to FIG. 2.

First, the light sheet microscope apparatus 1 acquires an image of the sample S onto which a light sheet emitted from the illumination optical system 10 has been radiated (Step S1). Here, the illumination optical system 10 radiates a light sheet onto the sample S, and the imaging device 30 captures an image of the sample S and generates image data of the sample S. The generated image data of the sample S is output to the controller 40.

Next, the light sheet microscope apparatus 1 determines a subordinate ray angle with respect to the width direction of the light sheet on the basis of the acquired image (Step S2). The subordinate ray angle is a maximum angle formed by the optical axis on the exit side of the illumination optical system 10 and the subordinate ray of a light sheet emitted from the illumination optical system 10. Further, the subordinate ray angle with respect to the width direction is a subordinate ray angle in a cross-section that includes the width direction and the traveling direction of the light sheet.

In a light sheet illumination, if the sample S has a light-blocking portion in an illuminated area, a striped shadow will occur behind that portion. However, if the subordinate ray angle of a light sheet is not less than zero degrees, light can enter an area behind the light-blocking portion, which results in being able to suppress the striped shadow. Further, if the light sheet has a larger subordinate ray angle, the light can enter an area closer to the light-blocking portion, which results in being able to suppress the striped shadow more effectively.

Figure 3:
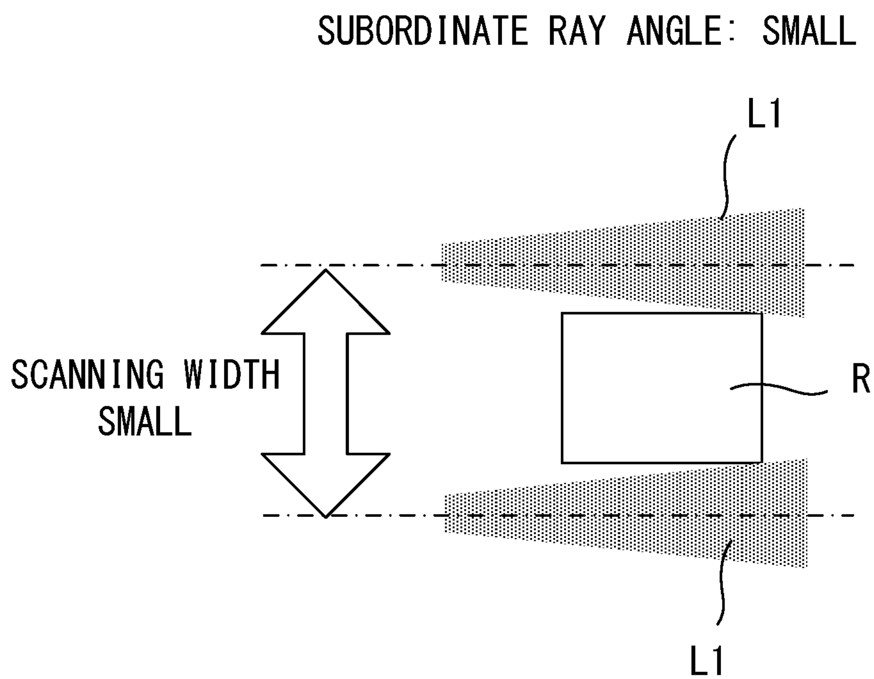
FIG. 3 illustrates a scanning range when a light sheet having a small subordinate ray angle is radiated.

On the other hand, as illustrated in FIGS. 3 and 4, in order to realize a uniform illumination on an observation range R, a scanning width will be wider when a light sheet L2 having a large subordinate ray angle is radiated, compared to when a light sheet L1 having a small subordinate ray angle is radiated. This results in a decrease in illumination efficiency and it takes a long time to acquire an image.

Thus, it is preferable that the subordinate ray angle be determined taking into consideration the balance between a stripe eliminating effect and an illumination performance. Further, even if importance is placed on the stripe eliminating effect, it is preferable that the subordinate ray angle be set to be small as long as a striped shadow is suppressed to the extent acceptable to an observer.

However, the size of a striped shadow differs according to the size of a light-blocking portion, and the size of a light-blocking portion differs according to a sample (in particular, an observed portion in the sample). Thus, the subordinate ray angle that can meet the requirements of the observer also differs according to the sample. Therefore, in Step S2, the controller 40 determines the subordinate ray angle with respect to the width direction of a light sheet emitted from the illumination optical system 10 on the basis of an image of the sample S onto which the light sheet has been radiated, the image of the sample S being acquired by the imaging device 30. Further, the controller 40 outputs, to the setting device 60, a control signal that gives an instruction to perform a setting of the illumination optical system 10 that corresponds to the subordinate ray angle determined by the controller 40. A method for determining a subordinate ray angle will be described in detail later.

When the subordinate ray angle has been determined, the light sheet microscope apparatus 1 performs a setting of the illumination optical system 10 according to the determined subordinate ray angle (Step S3), and radiates a light sheet onto the sample (Step S4). Here, the setting device 60 performs a setting of the illumination optical system 10 according to a control signal output from the controller 40. In other words, the setting device 60 performs a setting of the illumination optical system 10 according to the subordinate ray angle determined by the controller 40.

According to the light sheet microscope apparatus 1, it is possible to perform a setting for obtaining a sufficient stripe eliminating effect while suppressing a reduction in illumination performance, by determining a subordinate ray angle on the basis of an image. Further, the controller 40 determines the subordinate ray angle on the basis of the image and the setting device 60 performs a setting according to the determined subordinate ray angle, so a user can easily perform an appropriate setting even if he/she is not used to manipulating a microscope.

Figure 5A:
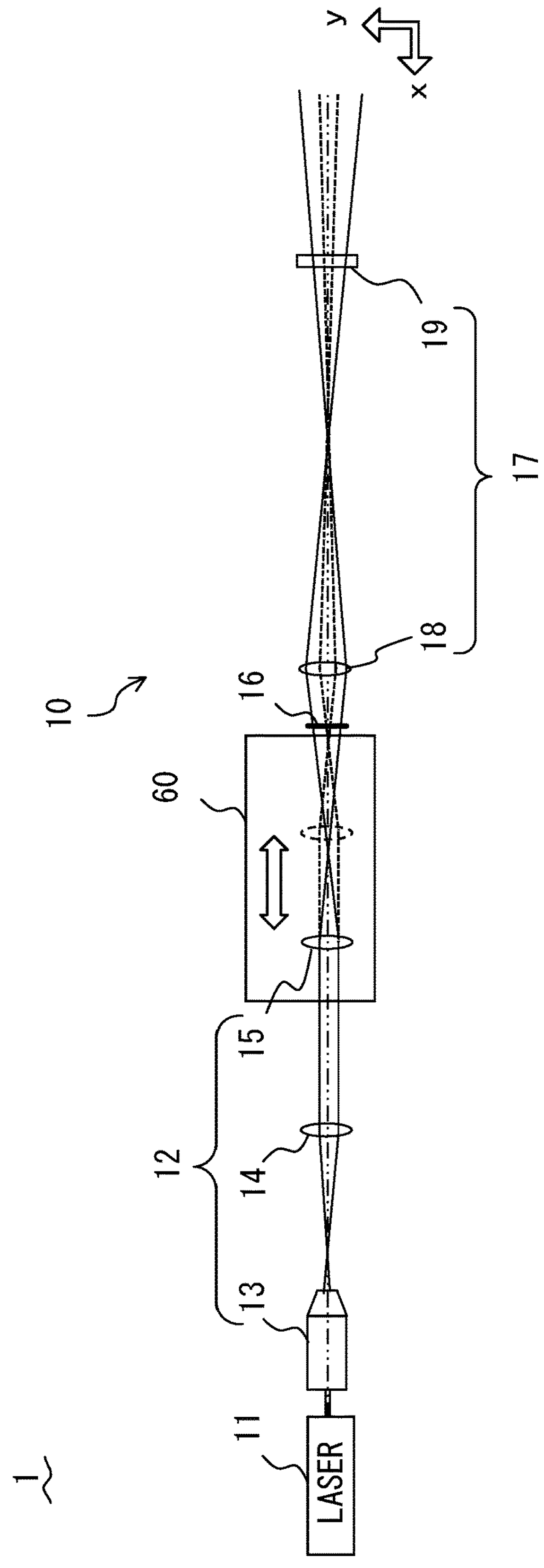
FIG. 5A illustrates the light sheet microscope apparatus according to the first embodiment and an illumination beam, as viewed from a thickness direction of a light sheet.

Referring to FIGS. 5A to 9, the present embodiment is further described in detail below. FIGS. 5A and 5B illustrate a configuration of the light sheet microscope apparatus 1. FIGS. 5A and 5B each illustrate the light sheet microscope apparatus 1 and an illumination beam, as viewed from the thickness direction (z-axis direction) and the width direction (y-axis direction) of a light sheet, respectively.

In addition to the illumination optical system 10, the detection optical system 20, the imaging device 30, the controller 40, and the setting device 60 described above, the light sheet microscope apparatus 1 further includes a display device 51 and input devices (a keyboard 52 and a mouse 53) that are connected to the controller 40.

The illumination optical system 10 includes a laser 11. The laser 11 is a light source that emits a laser beam (illumination light) that will be converted into a light sheet. The illumination optical system 10 further includes, in order from the side of the laser 11, a first optical system 12, a scanner 16, and a scanning optical system 17.

The first optical system 12 is an optical system that is arranged between the laser 11 and the scanner 16 and that radiates a laser beam onto the scanner 16. The first optical system 12 includes a lens 13, a lens 14, and a cylindrical lens 15. The cylindrical lens 15 is a movable lens arranged to be movable in the optical-axis direction. The cylindrical lens 15 is arranged to have a refractive power in an xy plane and to not have a refractive power in an xz plane.

The scanner 16 is a scanning unit that scans the sample S with a light sheet in the width direction of the light sheet, and is, for example, a rotatable mirror having a deflection surface that deflects light, such as a galvanometer mirror or a resonant mirror. Further, the scanner 16 may be, for example, an AOD (acousto-optic deflector) or an EOD (electro-optic deflector). In order to simplify the figures, in FIGS. 5A and 5B, optical elements situated in optical paths of light before and after the light is deflected by the scanner 16 are described in alignment with one another.

The scanning optical system 17 includes a cylindrical lens 18 and a cylindrical lens 19, and radiates light deflected by the scanner 16 onto a sample. The cylindrical lens 18 is arranged to have a refractive power in the xy plane and to not have a refractive power in the xz plane. The cylindrical lens 19 is arranged to have a refractive power in the xz plane and to not have a refractive power in the xy plane. In other words, the cylindrical lens 18 and the cylindrical lens 19 are arranged such that a plane in which the cylindrical lens 18 has a refractive power and a plane in which the cylindrical lens 19 has a refractive power are perpendicular to each other. Further, it is preferable that the cylindrical lens 19 be arranged such that a rear focal position of the cylindrical lens 19 is situated in a range of the field of view of the detection optical system 20, and it is more preferable that the cylindrical lens 19 be arranged such that the rear focal position of the cylindrical lens 19 is situated on the optical axis of the detection optical system 20.

The scanning optical system 17 is further arranged such that the scanner 16 is situated at a front focal position of the scanning optical system 17 in a light sheet plane (in the xy plane). In other words, the scanning optical system 17 is arranged such that the scanner 16 is situated at a front focal position of the cylindrical lens 18 arranged closest to an object among the cylindrical lenses of the scanning optical system 17. The front focal position of the cylindrical lens 18 is a position at which light is collected into a line when a collimated beam enters the cylindrical lens 18 from the side close to a sample.

The detection optical system 20 includes, in order from the side of the sample S, an objective 21, a wavelength selective element 22, and a tube lens 23. The wavelength selective element 22 is, for example, a barrier filter for preventing a laser beam from entering the imaging device 30.

The setting device 60 is a device that performs a setting of the illumination optical system 10, and specifically, a device that changes the position of the cylindrical lens 15 in its optical-axis direction. As a structure that moves the cylindrical lens 15 in the optical-axis direction of the cylindrical lens 15, the setting device 60 includes a ball screw 61, a nut 62 screwed with the ball screw 61, a holding unit 63 that holds the cylindrical lens 15, and a motor 64 that rotates the ball screw 61. When the setting device 60 moves the cylindrical lens 15 in the optical-axis direction of the cylindrical lens 15, the focal length of the first optical system 12 is changed, which results in changing the subordinate ray angle with respect to the width direction of a light sheet emitted from the illumination optical system 10, as illustrated in FIG. 5A.

In the light sheet microscope apparatus 1 having the configuration described above, a laser beam emitted from the laser 11 enters the scanner 16 through the cylindrical lens 15 after its beam diameter is adjusted in the lens 13 and the lens 14. After that, the laser beam deflected in the scanner 16 is radiated onto the sample S through the cylindrical lens 18 and the cylindrical lens 19.

The cylindrical lens 15 and the cylindrical lens 18 do not substantially act on a laser beam in the xz plane because they do not have a refractive power in the xz plane. Further, the scanner 16 that deflects light in the width direction also does not substantially act on a laser beam in the xz plane. Thus, as illustrated in FIG. 5B, a laser beam is collected into a certain position by the cylindrical lens 19 independent of a position of the cylindrical lens 15 or a deflection angle of the scanner 16, as viewed from the width direction (y-axis direction).

Further, the cylindrical lens 15 and the cylindrical lens 18 have a refractive power in the xy plane. Thus, as illustrated in FIG. 5A, a laser beam is emitted from the cylindrical lens 18 in a state in which it has a different subordinate ray angle with respect to the width direction according to the position of the cylindrical lens 15, and is radiated onto the sample S through the cylindrical lens 19, as viewed from the thickness direction (z-axis direction). However, the scanner 16 is arranged at the front focal position of the cylindrical lens 18, so the direction of the principal ray of the laser beam is constant independent of the angle of the scanner 16.

Thus, according to the light sheet microscope apparatus 1, it is possible to change a subordinate ray angle with respect to the direction of the width of a light sheet according to the position of the cylindrical lens 15. Further, it is possible to illuminate an illumination range uniformly because a sample can be scanned while maintaining the direction of the principal ray.

Figure 6:
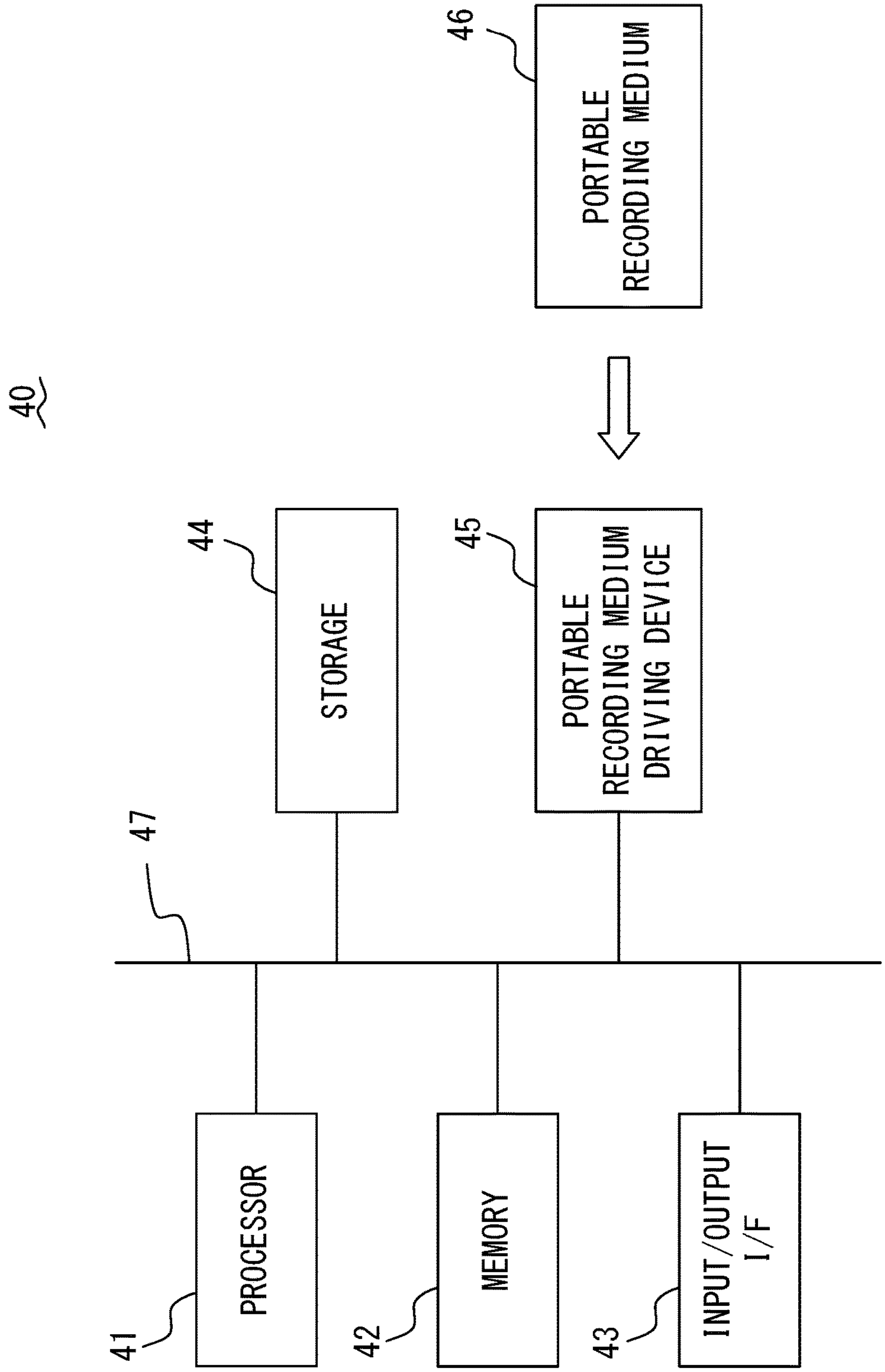
FIG. 6 illustrates a hardware configuration of a controller according to the first embodiment.

FIG. 6 illustrates a hardware configuration of the controller 40. The controller 40 is, for example, a standard computer. The controller 40 includes a processor 41, a memory 42, an input/output interface 43, a storage 44, and a portable recording medium driving device 45 into which a portable recording medium 46 is inserted, wherein these components are connected to one another through a bus 47. FIG. 6 is an example of a hardware configuration of the controller 40, and the controller 40 is not limited to this configuration.

The processor 41 is, for example, a CPU (central processing unit), an MPU (micro processing unit), or a DSP (digital signal processor), and executes a program so as to perform programmed processing. The memory 42 is, for example, a RAM (random access memory), and upon the execution of the program, the memory 42 temporarily stores therein a program or data recorded in the storage 44 or the portable recording medium 46.

The input/output interface 43 is a circuit that communicates a signal with a device other than the controller 40 (such as the imaging device 30, the display device 51, and the setting device 60). The storage 44 is, for example, a hard disk or a flash memory and is mainly used to record various pieces of data and programs. The portable recording medium driving device 45 is used to accommodate the portable recording medium 46 such as an optical disk or a CompactFlash®. The portable recording medium 46 has a role in assisting the storage 44.

FIG. 7 illustrates a functional configuration of the controller 40. The controller 40 includes an image acquisition unit 40*a*, an image comparison unit 40*b*, an angle determination unit 40*c*, and an output unit 40*d*. At least one of these units may be configured on the memory 42 by the processor 41 loading a program recorded in the storage 44 or the portable recording medium 46 into the memory 42 and executing the loaded program. Alternatively, at least one of these units may be configured by hardware such as an integrated circuit such as an FPGA (field-programmable gate array) or an ASIC (application specific integrated circuit).

The image acquisition unit 40*a* acquires, from the imaging device 30, an image of a sample that has been acquired by the imaging device 30. The image comparison unit 40*b* compares a plurality of images of the sample that have been acquired by the imaging device 30. The angle determination unit 40*c* determines a subordinate ray angle with respect to the width direction of a light sheet on the basis of a result of the comparison performed by the image comparison unit 40*b*. The output unit 40*d* outputs, to the setting device 60, a control signal that gives an instruction to perform a setting of the illumination optical system 10 that corresponds to the subordinate ray angle determined by the angle determination unit 40*c*.

FIG. 8 is a flowchart that illustrates a procedure of illumination setting processing. FIG. 9 is a flowchart that illustrates a procedure of image acquisition processing. Referring to FIGS. 8 and 9, the illumination setting processing performed in the light sheet microscope apparatus 1 is specifically described below.

First, the light sheet microscope apparatus 1 performs an initial setting of a subordinate ray angle of a light sheet emitted from the illumination optical system 10 (Step S100). Here, the controller 40 outputs a control signal to the setting device 60 such that a subordinate ray angle with respect to the width direction of the light sheet is a predetermined angle, and the setting device 60 performs a setting of the illumination optical system 10 according to the control signal. It is sufficient if the predetermined angle is an angle at which a stripe occurs behind a light-blocking portion, and for example, the predetermined angle is zero degrees, at which the subordinate ray is parallel to the optical axis.

Next, the light sheet microscope apparatus 1 acquires an image of the sample S in the setting performed in Step S100 (Step S110). In this image acquisition processing, as illustrated in FIG. 9, the light sheet microscope apparatus 1 scans, using the scanner 16, the sample S with the light sheet emitted from the illumination optical system 10 in the width direction of the light sheet (Step S111), and captures, by the imaging device 30, the image of the sample S onto which the light sheet has been radiated (Step S112). Accordingly, the imaging device 30 generates image data of the sample S and outputs the image data to the controller 40, and the controller 40 acquires the image of the sample S. The image acquired here is an image of the sample S illuminated with uniform brightness. The reason is that, during scanning, the light sheet moves in a parallel fashion in the width direction while maintaining the direction of a principal ray of the light sheet, because the scanner 16 is arranged at the front focal position of the scanning optical system 17.

After that, the light sheet microscope apparatus 1 changes the setting of the subordinate ray angle of the light sheet (Step S120), and acquires an image of the sample S in a setting after the change (Step S130). In Step S120, the controller 40 outputs a control signal to the setting device 60 such that the subordinate ray angle is different than a currently set angle (hereinafter referred to as a current angle), and the setting device 60 performs a setting of the illumination optical system 10 according to the control signal. It is sufficient if the angle set in Step S120 is an angle at which the size of a stripe is the same as or smaller than the size of a stripe at the current angle, and it may be set to be larger than the current angle by a predetermined value. Step S130 is similar to Step S110.

The light sheet microscope apparatus 1 compares a plurality of images of the sample S (Step S140). Here, the controller 40 compares a plurality of images of the sample S onto which light sheets with different subordinate ray angles have been radiated, and evaluates a change in image. Specifically, the change in image may be evaluated by comparing values each obtained by integrating pixel values in an image in one axis direction (for example, in the x-axis direction or the y-axis direction). Further, the change in image may be evaluated by comparing values each obtained by integrating differences between adjacent pixels in an image in one axis direction (for example, in the y-axis direction). Furthermore, the change in image may be evaluated by comparing spatial frequency distributions each obtained by Fourier transforming an image.

After that, the light sheet microscope apparatus 1 determines whether the change in image is small (Step S150). Here, on the basis of a result of the comparison in Step S140, the controller 40 determines whether a value representative of a change in image is smaller than a predetermined value. The value representative of a change in image may be, for example, a value of a difference between values compared between images in Step S140, or it may be a value obtained by standardizing the difference by use of a change amount of subordinate ray angle.

When the change in image has been determined to not be small, the light sheet microscope apparatus 1 performs the processes of Step S120 to Step S150 again. The light sheet microscope apparatus 1 repeats the processes until the change in image is determined to be small in Step S150.

When the change in image has been determined to be small, the light sheet microscope apparatus 1 determines the subordinate ray angle (Step S160). Here, for example, the controller 40 determines, to be the subordinate ray angle that is to be set in the illumination optical system 10, an angle smallest among a plurality of angles corresponding to a plurality of images in which the change has been determined to be small. In other words, the subordinate ray angle is determined on the basis of a result of comparing a plurality of images.

Finally, the light sheet microscope apparatus 1 sets the angle determined in Step S160 to be the subordinate ray angle (Step S170), and terminates the illumination setting processing. Here, the controller 40 outputs a control signal to the setting device 60 such that the subordinate ray angle is an angle determined in Step S160, and the setting device 60 performs a setting of the illumination optical system 10 according to the control signal.

After that, the light sheet microscope apparatus 1 radiates alight sheet onto the sample S in the setting performed in Step S170 and acquires an image of the sample S, the observer observes the sample S.

When the light sheet microscope apparatus 1 performs the illumination setting processing described above, a value of the subordinate ray angle is determined in which there no longer occurs a change in image even if the subordinate ray angle is made larger than the determined value, and the setting of the illumination optical system 10 is performed such that the subordinate ray angle of a light sheet emitted from the illumination optical system 10 is the determined value. The state in which there no longer occurs a change in image even if the subordinate ray angle is changed is a state in which a stripe extending behind a light-blocking portion is sufficiently small and less noticeable. According to the illumination setting processing described above, it is possible to perform a setting that permits obtaining of a sufficient stripe eliminating effect while suppressing a reduction in illumination performance, because the subordinate ray angle is not set to be too large. Thus, it is possible to easily perform an appropriate illumination setting for a light sheet illumination.

In the illumination setting processing illustrated in FIG. 8, the example in which the subordinate ray angle is gradually made larger until there no longer occurs a change in image has been described, but the light sheet microscope apparatus 1 may gradually make the subordinate ray angle smaller until there occurs a change in image. In this case, it is preferable that the initial setting of the subordinate ray angle be a sufficiently large angle such that a stripe does not occur or is less noticeable.

Further, in the illumination setting processing illustrated in FIG. 8, the example in which images acquired by the imaging device 30 are compared has been described, but a change in image due to a fluorescent material being faded may be excluded and a change in image due to a change in subordinate ray angle may be evaluated. For this purpose, images to be compared may be corrected before the images are compared. For example, a plurality of images may be compared after the images are corrected such that corresponding areas, in the images, in which a stripe does not occur have the same brightness as one another.

Second Embodiment

A light sheet microscope apparatus according to a second embodiment is different from the light sheet microscope apparatus 1 in that it includes a controller 70 instead of the controller 40. It is similar to the light sheet microscope apparatus 1 in regard to the other points.

Figure 10:
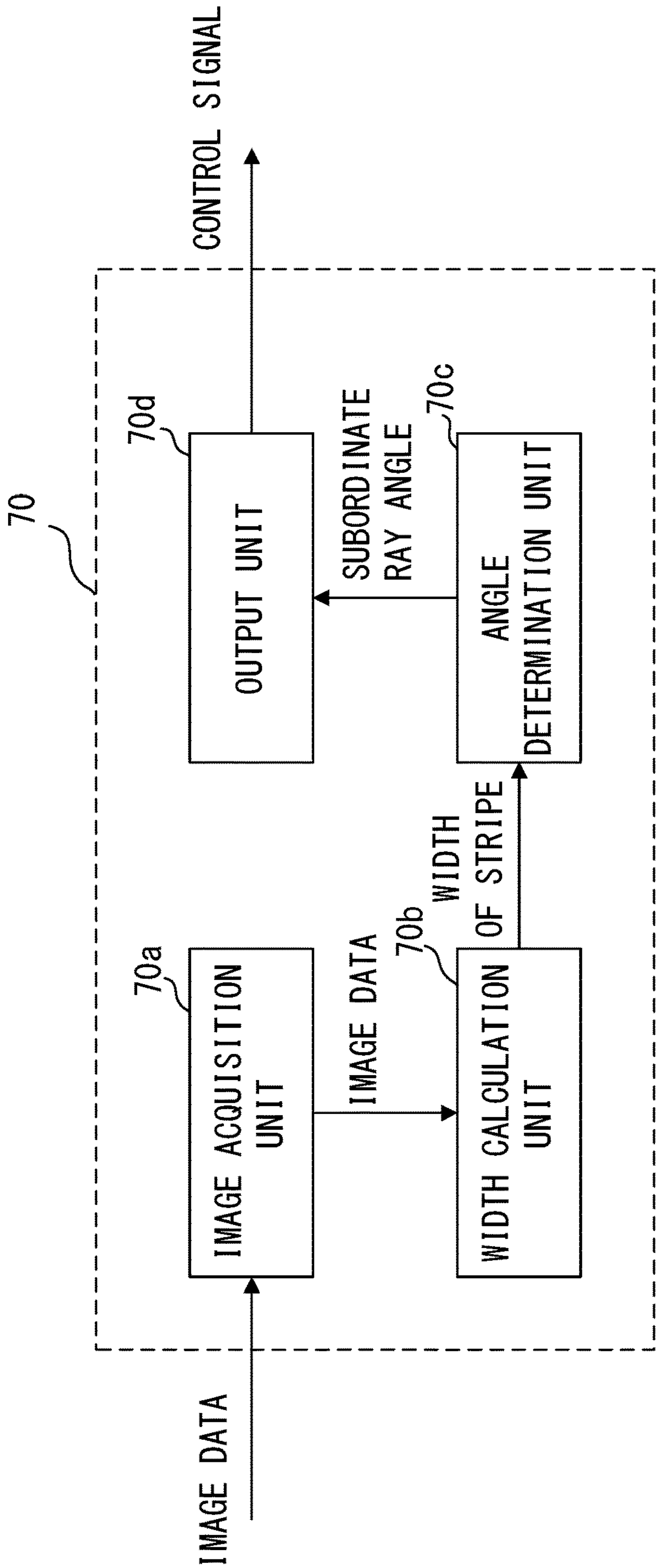
FIG. 10 illustrates a functional configuration of a controller according to a second embodiment.

FIG. 10 illustrates a functional configuration of the controller 70. The controller 70 includes an image acquisition unit 70*a*, a width calculation unit 70*b*, an angle determination unit 70*c*, and an output unit 70*d*. The hardware configuration of the controller 70 is similar to that of the controller 40. At least one of the units described above may be configured on the memory 42 by the processor 41 loading a program into the memory 42 and executing the loaded program, and it may be configured by hardware such as an integrated circuit such as an FPGA or an ASIC.

The image acquisition unit 70*a* acquires, from the imaging device 30, an image of the sample S that has been acquired by the imaging device 30. On the basis of the image of the sample S that has been acquired by the imaging device 30, the width calculation unit 70*b* calculates the width of a stripe that appears in the image of the sample S. The angle determination unit 70*c* determines a subordinate ray angle with respect to the width direction of a light sheet on the basis of the width of the stripe that has been calculated by the width calculation unit 70*b*. The output unit 70*d* outputs, to the setting device 60, a control signal that gives an instruction to perform a setting of the illumination optical system 10 that corresponds to the subordinate ray angle determined by the angle determination unit 70*c*. The width of a stripe is the length of a stripe with respect to the width direction of a light sheet.

Figure 11:
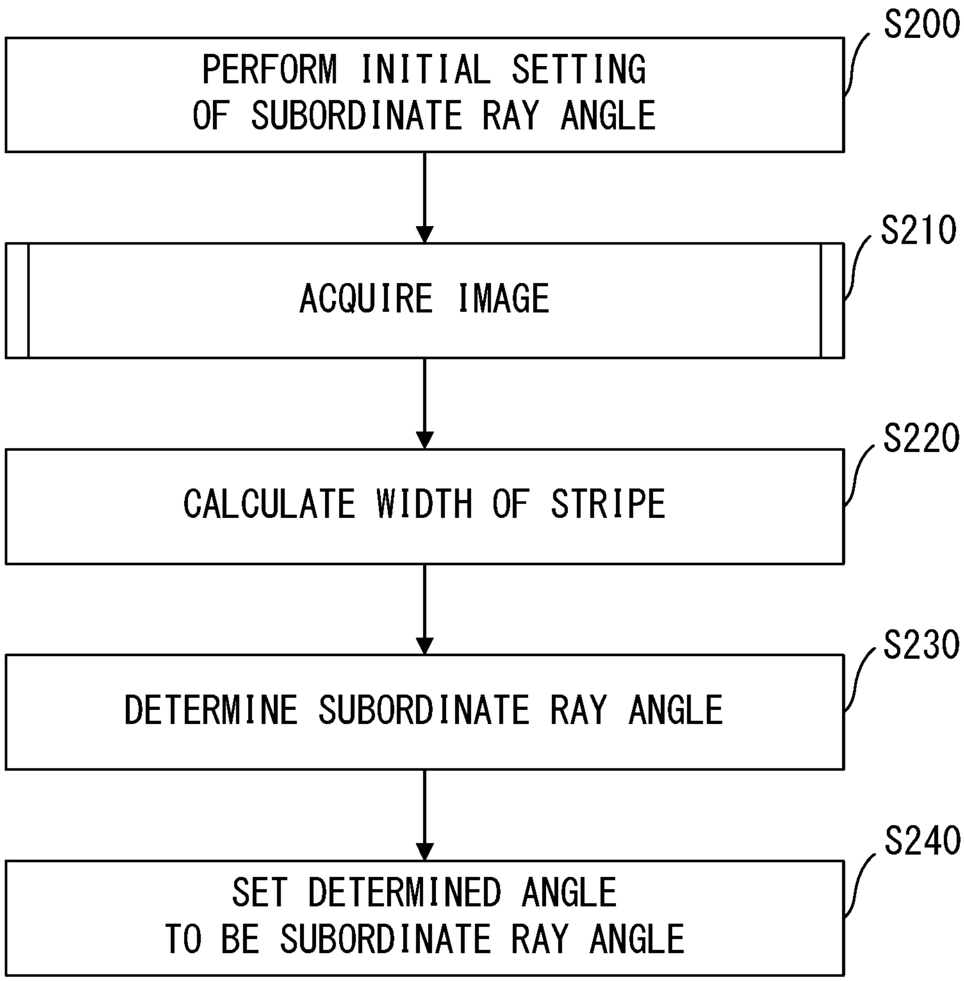
FIG. 11 is a flowchart that illustrates a procedure of illumination setting processing according to the second embodiment.

FIG. 11 is a flowchart that illustrates a procedure of illumination setting processing. Referring to FIG. 11, the illumination setting processing performed in the light sheet microscope apparatus according to the present embodiment is described below, focusing on the difference from the illumination setting processing illustrated in FIG. 8.

First, the light sheet microscope apparatus performs an initial setting of a subordinate ray angle of a light sheet emitted from the illumination optical system 10 (Step S200), and acquires an image of the sample S in the initial setting (Step S210). Step S200 and Step S210 are similar to Step S100 and Step S110 of FIG. 8.

When the image has been acquired, the light sheet microscope apparatus calculates the width of a stripe (Step S220). Here, the controller 70 calculates the width of a stripe that appears in the image on the basis of the image acquired in Step S210. Specifically, pixel values in the image are integrated in the x-axis direction, and a row of pixels in the image in which an integration value is not greater than a predetermined value is identified. Then, the width of a stripe is calculated from the number of rows situated adjacent to one another, the rows situated adjacent to one another being from among the identified rows of pixels. The fact that an integration value of a row in which a stripe has occurred is smaller than an integration value of a row in which a stripe has not occurred is applied to this calculation method. When there exist a plurality of sets of rows situated adjacent to one another, it is preferable that a set of rows that is constituted of a largest number of rows be identified and that the width of a stripe be calculated from the number of rows included in the set.

When the width of the stripe has been calculated, the light sheet microscope apparatus determines the subordinate ray angle (Step S230). Here, the controller 70 determines the subordinate ray angle on the basis of the width of the stripe that has been calculated in Step S220. Specifically, the subordinate ray angle may be geometrically calculated, for example, on the basis of the width of the stripe that has been calculated in Step S220 and a preset acceptable length of the stripe. The acceptable length of a stripe is the length of the stripe with respect to the optical-axis direction of the illumination optical system 10.

Finally, the light sheet microscope apparatus sets the angle determined in Step S230 to be the subordinate ray angle (Step S240), and terminates the illumination setting processing. Step S240 is similar to Step S170 of FIG. 8. After that, the light sheet microscope apparatus radiates a light sheet onto the sample S in the setting performed in Step S240 and acquires an image of the sample S, an observer observes the sample S.

When the light sheet microscope apparatus performs the illumination setting processing of FIG. 11, the width of a stripe is calculated from an image and a subordinate ray angle is determined on the basis of the width of the stripe. As in the first embodiment, this makes it possible to perform a setting that permits obtaining of a sufficient stripe eliminating effect while suppressing a reduction in illumination performance, because the subordinate ray angle is not set to be too large. Thus, it is possible to easily perform an appropriate illumination setting for a light sheet illumination.

Further, in the illumination setting processing illustrated in FIG. 11, only one image is sufficient. Thus, according to the present embodiment, it is possible to perform an illumination setting in a shorter time than according to the first embodiment in which a plurality of images are acquired and a comparison is performed repeatedly. In addition, it is also possible to suppress damage caused to a sample due to an illumination setting.

The width of a stripe corresponds to the width of a light-blocking portion, so it hardly varies near the light-blocking portion. However, when the subordinate ray has an angle with respect to the optical axis, the width of a stripe is smaller if the distance from the light-blocking portion is longer. Thus, when the width of a stripe is calculated using a value obtained by integrating pixel values in the x-axis direction, a reduction in integration value due to a factor other than the stripe and a reduction in integration value due to the stripe may be falsely recognized if the angle of the subordinate ray is large. In order to prevent this, it is preferable that the subordinate ray angle set in Step S200 be smaller. In particular, it is preferable that the subordinate ray angle be set to zero degrees, at which the subordinate ray is parallel to the optical axis.

Figure 12:
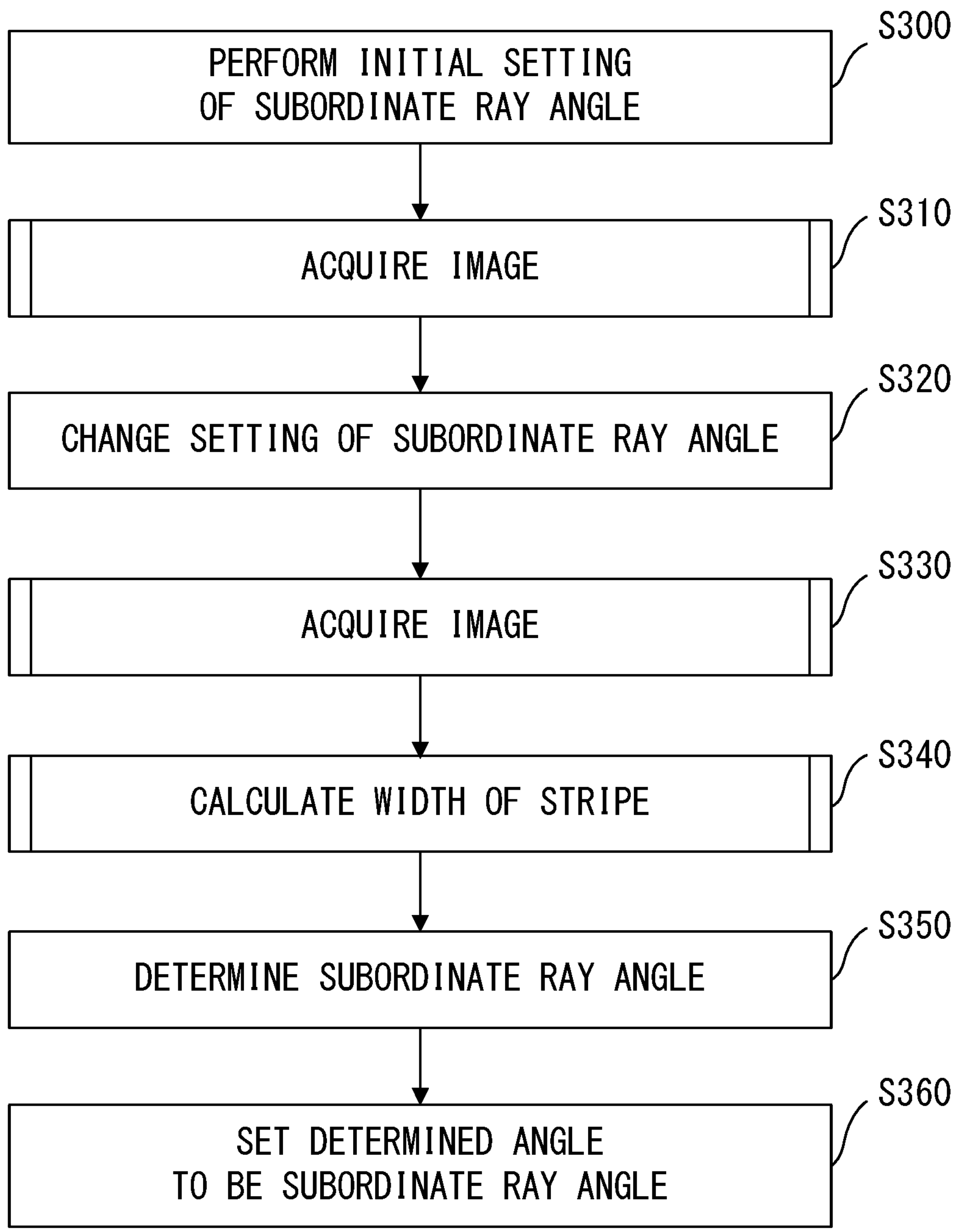
FIG. 12 is a flowchart that illustrates another procedure of illumination setting processing according to the second embodiment.
Figure 13:
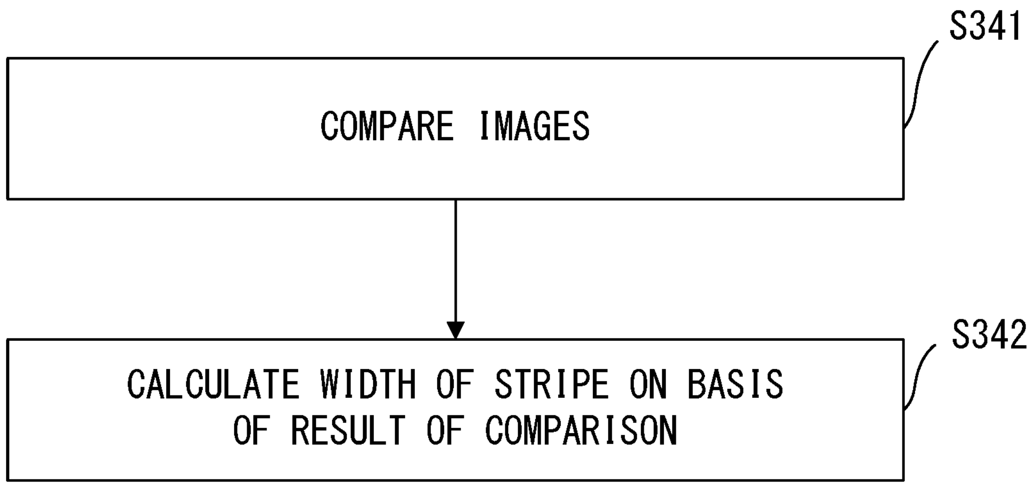
FIG. 13 is a flowchart that illustrates another procedure of width calculation processing according to the second embodiment.

FIG. 12 is a flowchart that illustrates another procedure of illumination setting processing. FIG. 13 is a flowchart that illustrates another procedure of width calculation processing. The light sheet microscope apparatus according to the present embodiment may perform illumination setting processing of FIGS. 12 and 13 instead of the illumination setting processing of FIG. 11.

First, the light sheet microscope apparatus performs an initial setting of a subordinate ray angle of a light sheet emitted from the illumination optical system 10 (Step S300), and acquires an image of the sample S in the initial setting (Step S310). Steps S300 and Step S310 are similar to Step S200 and Step S210 of FIG. 11.

Next, the light sheet microscope apparatus changes the setting of the subordinate ray angle of the light sheet (Step S320), and acquires an image of the sample S in a setting after the change (Step S330). It is sufficient if the angle set in Step S320 is an angle at which a stripe is less likely to occur behind a light-blocking portion, and it is preferable that it be set to be relatively large.

After that, the light sheet microscope apparatus calculates the width of a stripe (Step S340). Here, on the basis of two images acquired in Step S310 and Step S330, the controller 70 calculates the width of a stripe that appears in each of the images. In this width calculation processing, the controller 70 compares two images (Step S341) and calculates the width of a stripe on the basis of a result of the comparison (Step S342). Specifically, a difference between values of the corresponding pixels in the two images may be taken, and the width of the stripe may be calculated from a distribution of pixels between which the difference is not less than a predetermined value. Further, pixel values in an image are integrated in the x-axis direction, and a row of pixels in which a difference in integration value between the two images is not less than a predetermined value is identified. Then, the width of the stripe may be calculated from the number of rows situated adjacent to one another, the rows situated adjacent to one another being from among the identified rows of pixels.

When the width of the stripe has been calculated, the light sheet microscope apparatus determines the subordinate ray angle (Step S350), sets the determined angle to be the subordinate ray angle (Step S360), and terminates the illumination setting processing. Step S350 and Step S360 are similar to Step S230 and Step S240 of FIG. 11. After that, the light sheet microscope apparatus radiates a light sheet onto the sample S in the setting performed in Step S350 and acquires an image of the sample S, an observer observes the sample S.

The illumination setting processing illustrated in FIG. 12 also permits obtaining of an effect similar to the illumination setting processing illustrated in FIG. 11. In other words, it is possible to perform a setting that permits obtaining of a sufficient stripe eliminating effect while suppressing a reduction in illumination performance without making the subordinate ray angle too large.

Third Embodiment

A light sheet microscope apparatus according to a third embodiment is different from the light sheet microscope apparatus 1 in that it includes a controller 80 instead of the controller 40. It is similar to the light sheet microscope apparatus 1 in regard to the other points.

Figure 14:
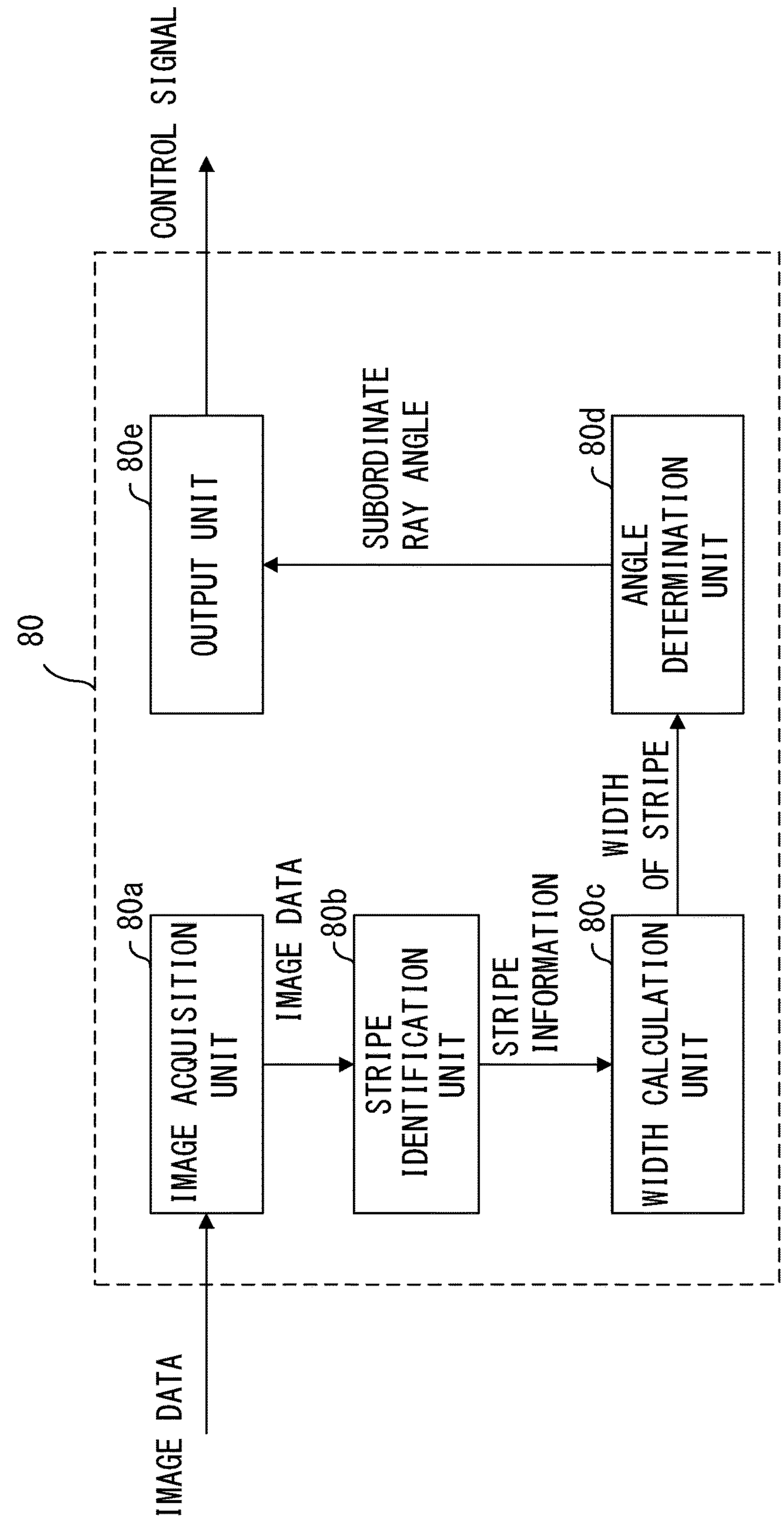
FIG. 14 illustrates a functional configuration of a controller according to a third embodiment.

FIG. 14 illustrates a functional configuration of the controller 80. The controller 80 includes an image acquisition unit 80*a*, a stripe identification unit 80*b*, a width calculation unit 80*c*, an angle determination unit 80*d*, and an output unit 80*e*. The hardware configuration of the controller 80 is similar to that of the controller 40. At least one of the units described above may be configured on the memory 42 by the processor 41 loading a program into the memory 42 and executing the loaded program, and it may be configured by hardware such as an integrated circuit such as an FPGA or an ASIC.

The image acquisition unit 80*a*, the angle determination unit 80*d*, and the output unit 80*e* are similar to the image acquisition unit 70*a*, the angle determination unit 70*c*, and the output unit 70*d* according to the controller 70 according to the second embodiment. On the basis of the image of the sample S that has been acquired by the imaging device 30, the stripe identification unit 80*b* identifies a stripe that appears in the image of the sample S. On the basis of the image of the sample S that has been acquired by the imaging device 30, in particular, on the basis of stripe information output from the stripe identification unit 80*b*, the width calculation unit 80*c* calculates the width of the stripe that appears in the image of the sample S.

Figure 15:
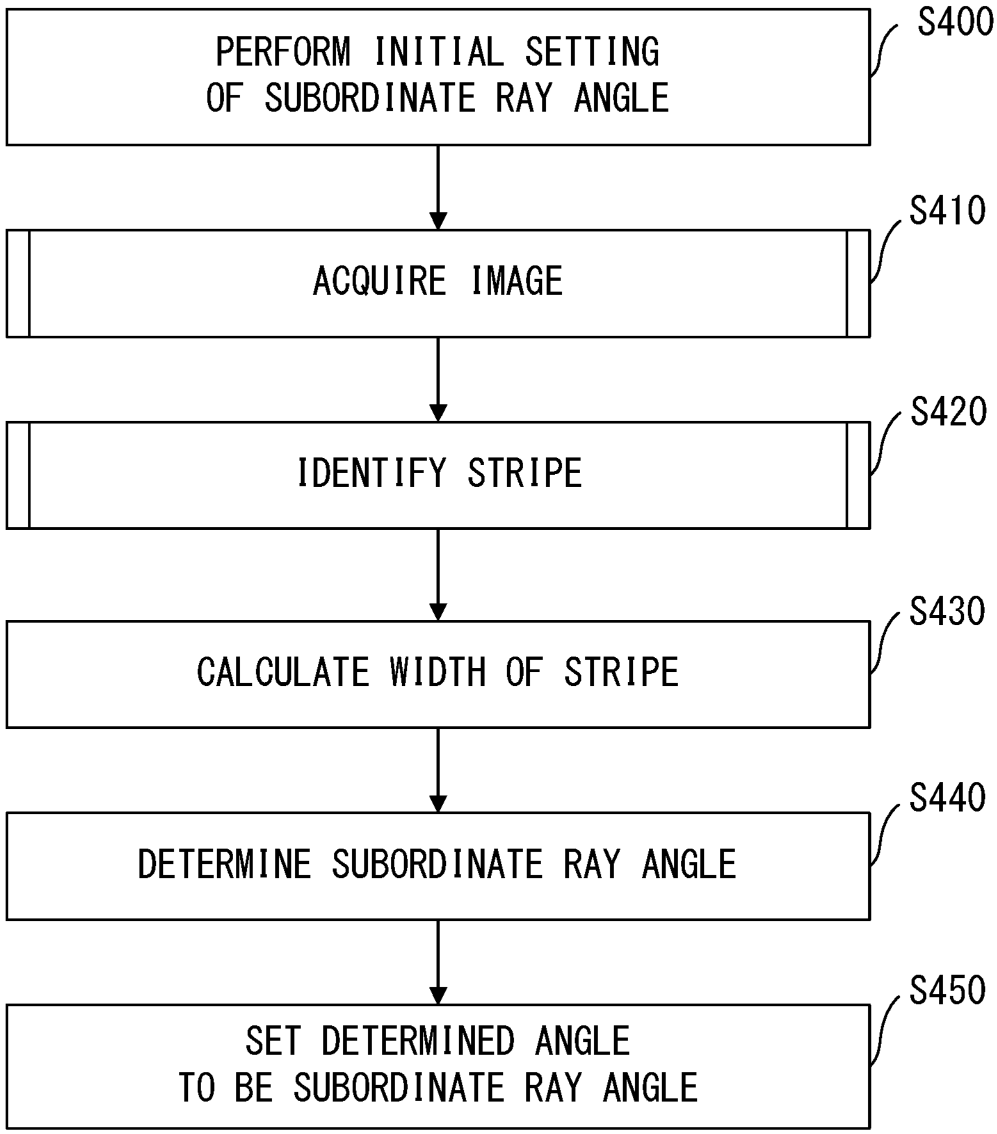
FIG. 15 is a flowchart that illustrates a procedure of illumination setting processing according to the third embodiment.
Figure 16:
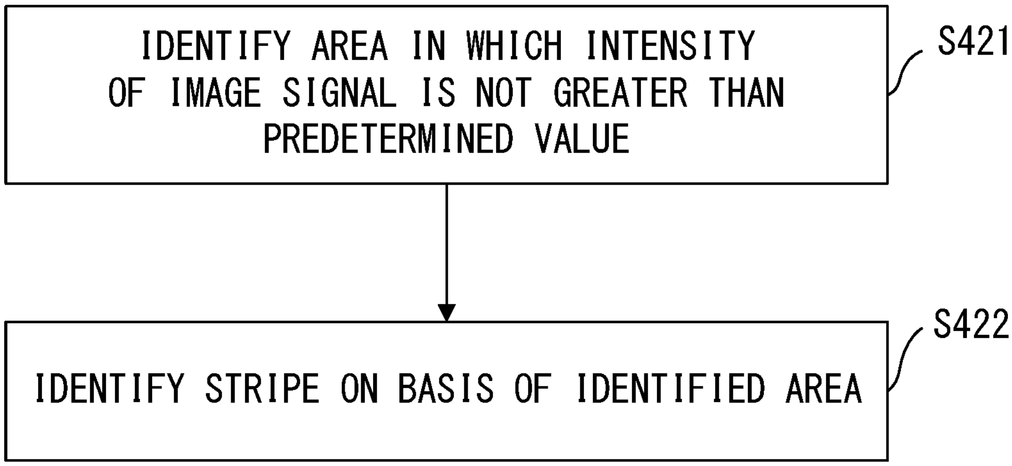
FIG. 16 is a flowchart that illustrates a procedure of stripe identification processing according to the third embodiment.

FIG. 15 is a flowchart that illustrates a procedure of illumination setting processing. FIG. 16 is a flowchart that illustrates a procedure of stripe identification processing. Referring to FIGS. 15 and 16, the illumination setting processing performed in the light sheet microscope apparatus according to the present embodiment is described below, focusing on the difference from the illumination setting processing illustrated in FIG. 11.

First, the light sheet microscope apparatus performs an initial setting of a subordinate ray angle of a light sheet emitted from the illumination optical system 10 (Step S400). The angle set here is an angle at which a stripe occurs behind a light-blocking portion, which is similar to Step S200 of FIG. 11. However, it is set to an angle other than zero degrees. After that, the light sheet microscope apparatus acquires an image of the sample S in the initial setting (Step S410). Step S410 is similar to Step S210 of FIG. 11.

When the image has been acquired, the light sheet microscope apparatus identifies a stripe (Step S420). Here, on the basis of the image acquired in Step S410, the controller 80 identifies a stripe that appears in the image. In this stripe identification processing, as illustrated in FIG. 16, first, on the basis of the image, the controller 80 identifies an area, in the image, in which a pixel value (that is, an intensity of image signal) is not greater than a predetermined value (Step S421). Further, a stripe is identified on the basis of the area identified in Step S421 (Step S422). In Step S422, for example, an area having a tapered shape from among the identified area may be identified as a stripe, the tapered shape having a width that becomes narrower in a direction in which the light sheet travels.

When the stripe has been identified, the light sheet microscope apparatus calculates the width of the stripe (Step S430). Here, the controller 80 calculates the width of the stripe by measuring, on the image, the width of the stripe identified in Step S420.

When the width of the stripe has been calculated, the light sheet microscope apparatus determines the subordinate ray angle (Step S440), sets the determined angle to be the subordinate ray angle (Step S450), and terminates the illumination setting processing. Step S440 and Step S450 are similar to Step S230 and Step S240 of FIG. 11. After that, an observer radiates a light sheet onto the sample S in the setting performed in Step S450 and acquires an image of the sample S, so as to observe the sample S.

When the light sheet microscope apparatus performs the illumination setting processing of FIG. 15, the width of a stripe is calculated from an image and a subordinate ray angle is determined on the basis of the width of the stripe. As in the first embodiment, this makes it possible to perform a setting that permits obtaining of a sufficient stripe eliminating effect while suppressing a reduction in illumination performance without making the subordinate ray angle too large. Thus, it is possible to easily perform an appropriate illumination setting for a light sheet illumination. Further, only one image is sufficient, so it is possible to perform an illumination setting in a shorter time and to suppress damage caused to a sample due to an illumination setting, as in the second embodiment.

Figure 17:
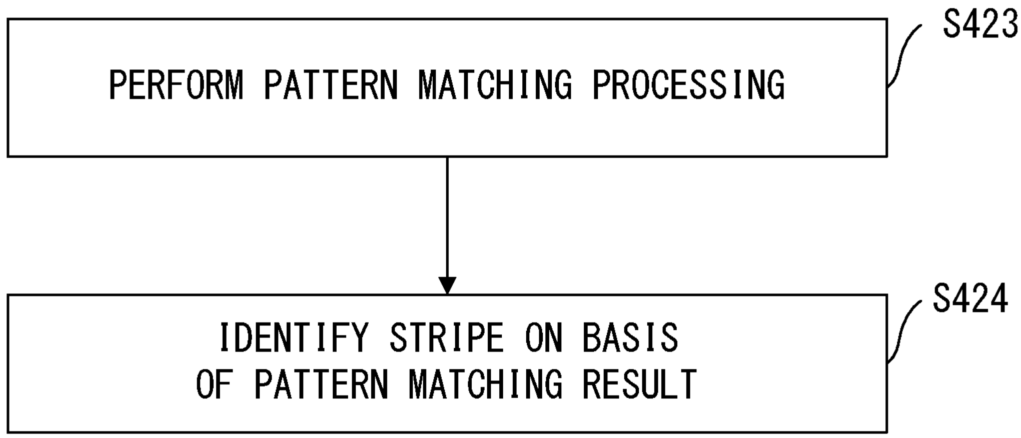
FIG. 17 is a flowchart that illustrates another procedure of stripe identification processing according to the third embodiment.

The stripe identification processing illustrated in FIG. 16 has been described as an example of a method for identifying a stripe, but the stripe identification processing illustrated in FIG. 17 may be performed. In other words, the controller 80 may perform pattern matching processing on an image on the basis of a preset stripe pattern (Step S423), so as to identify a stripe on the basis of a pattern matching result (Step S424).

Fourth Embodiment

A light sheet microscope apparatus according to a fourth embodiment is different from the light sheet microscope apparatus 1 in that it includes a controller 90 instead of the controller 40. It is similar to the light sheet microscope apparatus 1 in regard to the other points.

Figure 18:
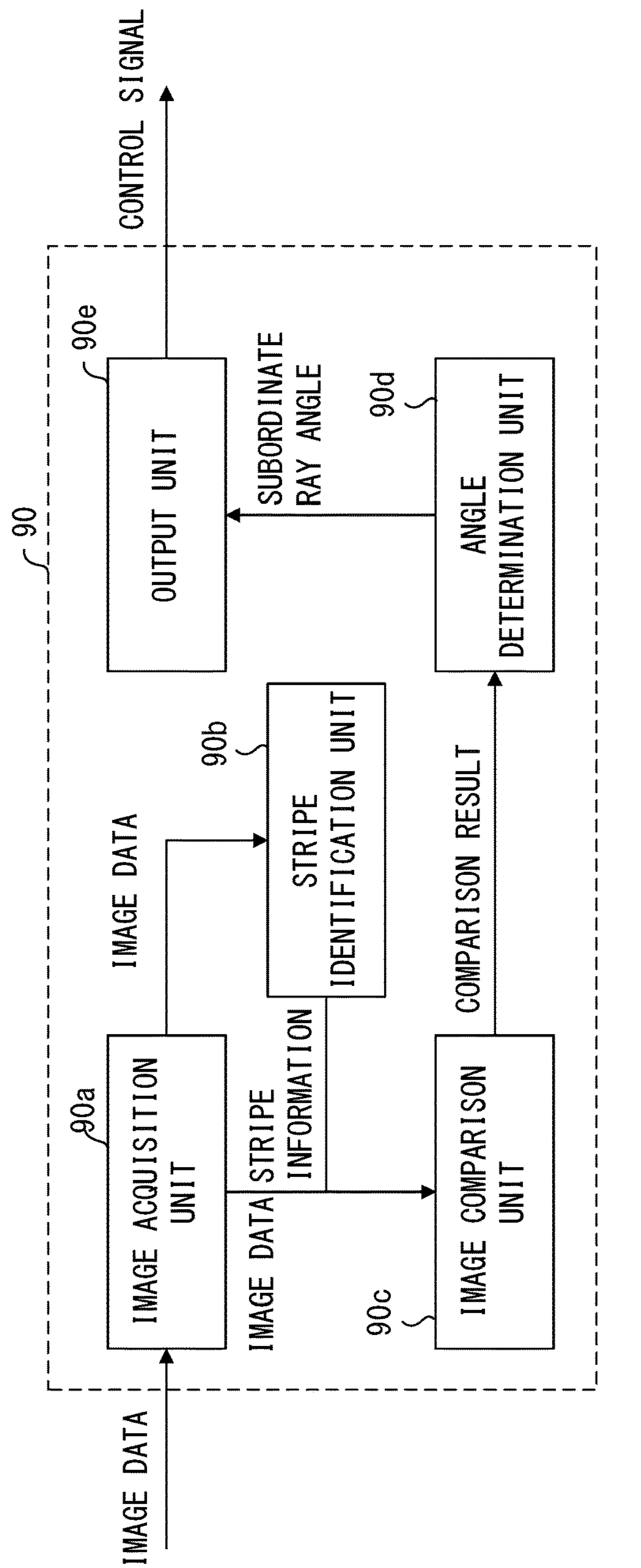
FIG. 18 illustrates a functional configuration of a controller according to a fourth embodiment.

FIG. 18 illustrates a functional configuration of the controller 90. The controller 90 includes an image acquisition unit 90*a*, a stripe identification unit 90*b*, an image comparison unit 90*c*, an angle determination unit 90*d*, and an output unit 90*e*. The hardware configuration of the controller 90 is similar to that of the controller 40. At least one of the units described above may be configured on the memory 42 by the processor 41 loading a program into the memory 42 and executing the loaded program, and it may be configured by hardware such as an integrated circuit such as an FPGA or an ASIC.

The image acquisition unit 90*a* and the output unit 90*e* are similar to the image acquisition unit 40*a* and the output unit 40*d* of the controller 40 according to the first embodiment. On the basis of the image of the sample S that has been acquired by the imaging device 30, the stripe identification unit 90*b* identifies a stripe that appears in the image of the sample S. The image comparison unit 90*c* compares a plurality of images of the sample that have been acquired by the imaging device 30, in particular, small regions, in the plurality of images, that each include an identified stripe. The small region is not the entirety of an image, but a region that is a portion of the image. The angle determination unit 90*d* determines a subordinate ray angle with respect to the width direction of a light sheet on the basis of a result of the comparison performed by the image comparison unit 90*c*, in particular, on the basis of a result of comparing the above-described small regions.

Figure 19:
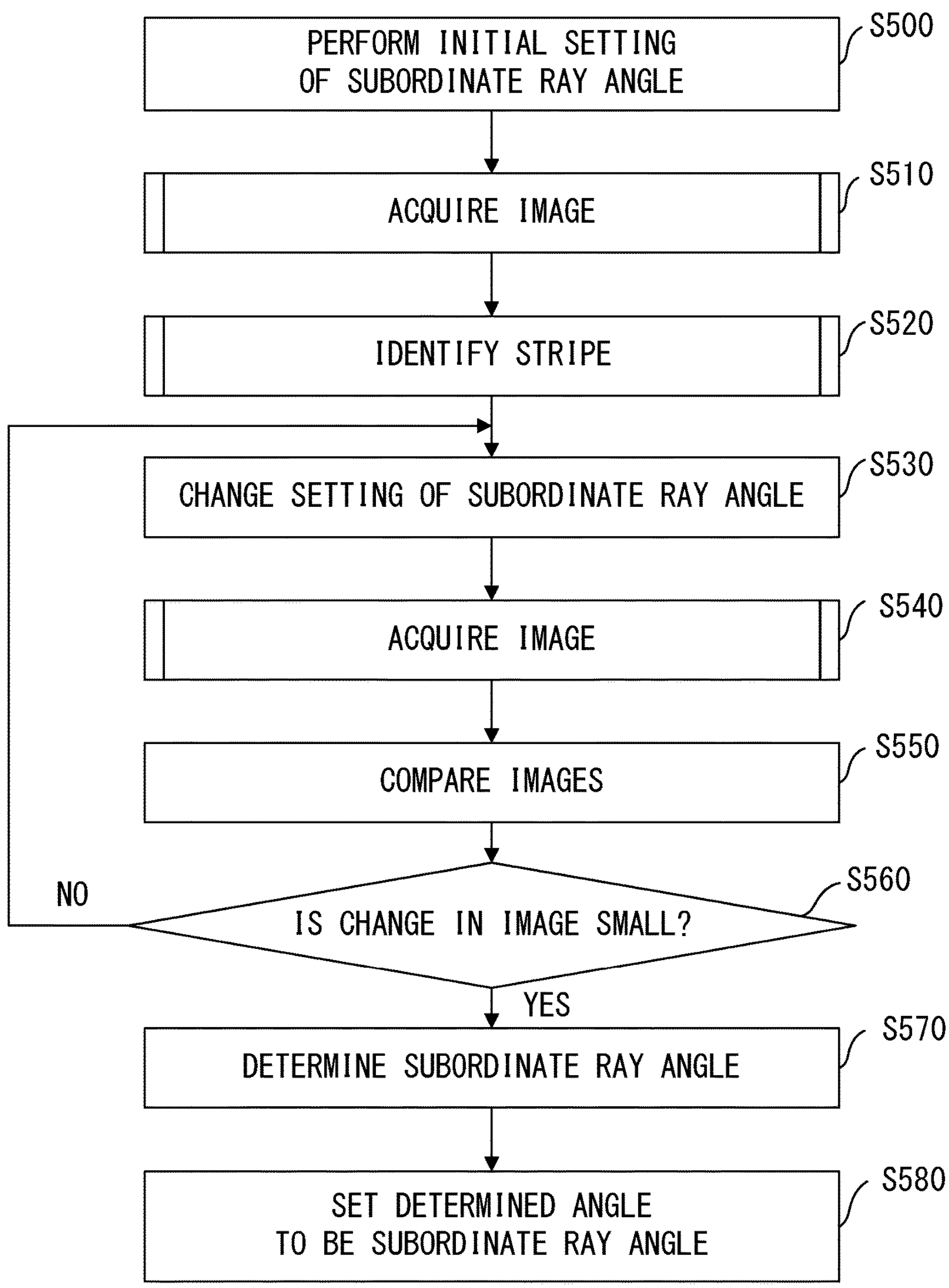
FIG. 19 is a flowchart that illustrates a procedure of illumination setting processing according to the fourth embodiment.

FIG. 19 is a flowchart that illustrates a procedure of illumination setting processing. Referring to FIG. 19, the illumination setting processing performed in the light sheet microscope apparatus according to the present embodiment is described below, focusing on the difference from the illumination setting processing illustrated in FIG. 8.

First, the light sheet microscope apparatus performs an initial setting of a subordinate ray angle of a light sheet emitted from the illumination optical system 10 (Step S500), and acquires an image of the sample S in the initial setting (Step S510). Step S500 and Step S510 are similar to Step S100 and Step S110 of FIG. 8.

When the image has been acquired, the light sheet microscope apparatus identifies a stripe (Step S520). Step S520 is similar to Step S420 of FIG. 15. After that, the light sheet microscope apparatus changes the setting of the subordinate ray angle of the light sheet (Step S530), and acquires an image of the sample S in a setting after the change (Step S540). Step S530 and Step S540 are similar to Step S120 and Step S130 of FIG. 8.

Next, the light sheet microscope apparatus compares a plurality of images of the sample S (Step S550). Here, the controller 90 compares small regions, in a plurality of images, that each include the stripe identified in Step S520, and evaluates a change in a small region in an image, the plurality of images being images of the sample S onto which light sheets with different subordinate ray angles have been radiated.

After that, the light sheet microscope apparatus determines whether the change in image is small (Step S560). Here, on the basis of a result of comparing the small regions in Step S550, the controller 90 determines whether a value representative of a change in a small region is smaller than a predetermined value.

When the change in image (the change in small region between images) has been determined to not be small, the light sheet microscope apparatus performs the processes of Step S530 to Step S560 again. The light sheet microscope apparatus repeats the processes until the change in image is determined to be small in Step S560.

When the change in image (the change in small region between images) has been determined to be small, the light sheet microscope apparatus determines the subordinate ray angle (Step S570), sets the determined angle to be the subordinate ray angle (Step S580), and terminates the illumination setting processing. Step S570 and Step S580 are similar to Step S160 and Step S170 of FIG. 8. After that, the light sheet microscope apparatus radiates a light sheet onto the sample S in the setting performed in Step S580 and acquires an image of the sample S, an observer observes the sample S.

When the light sheet microscope apparatus performs the illumination setting processing of FIG. 19, it is possible to perform a setting that permits obtaining of a sufficient stripe eliminating effect while suppressing a reduction in illumination performance without making the subordinate ray angle too large, as in the first embodiment. Thus, it is possible to easily perform an appropriate illumination setting for a light sheet illumination. Further, in the illumination setting processing illustrated in FIG. 19, small regions that each include a stripe are compared, so it is possible to detect a change in image due to a change in the stripe with a high sensitivity. Further, it is also possible to suppress an amount of calculation compared to when a comparison is performed on the entirety of an image.

Fifth Embodiment

A light sheet microscope apparatus according to a fifth embodiment is different from the light sheet microscope apparatus 1 in that it includes a controller 100 instead of the controller 40. It is similar to the light sheet microscope apparatus 1 in regard to the other points.

Figure 20:
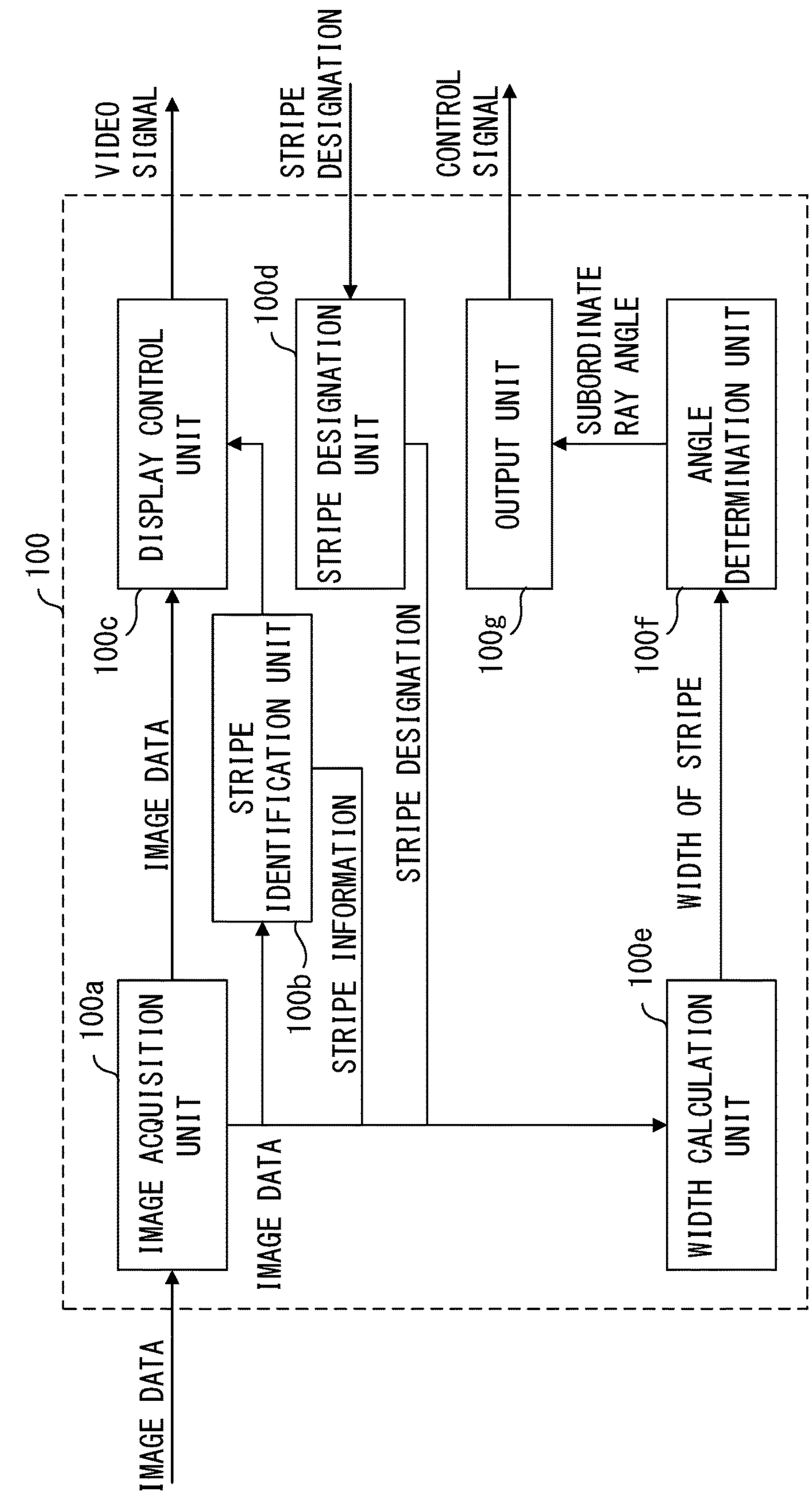
FIG. 20 illustrates a functional configuration of a controller according to a fifth embodiment.

FIG. 20 illustrates a functional configuration of the controller 100. The controller 100 includes an image acquisition unit 100*a*, a stripe identification unit 100*b*, a display control unit 100*c*, a stripe designation unit 100*d*, a width calculation unit 100*e*, an angle determination unit 100*f*, and an output unit 100*g*. The hardware configuration of the controller 100 is similar to that of the controller 40. At least one of the units described above may be configured on the memory 42 by the processor 41 loading a program into the memory 42 and executing the loaded program, and it may be configured by hardware such as an integrated circuit such as an FPGA or an ASIC.

The image acquisition unit 100*a* and the output unit 100*g* are similar to the image acquisition unit 40*a* and the output unit 40*d* of the controller 40. On the basis of the image of the sample S that has been acquired by the imaging device 30, the stripe identification unit 100*b* identifies a stripe that appears in the image of the sample S. The display control unit 100*c* displays, on the display device 51, an image of the sample in which a portion that is the stripe identified by the stripe identification unit 100*b* has been marked. The stripe designation unit 100*d* designates a stripe to be eliminated according to an input from an observer. The width calculation unit 100*e* calculates the width of the stripe designated by the stripe designation unit 100*d*. The angle determination unit 100*f* is similar to the angle determination unit 80*d* of the controller 80.

Figure 21:
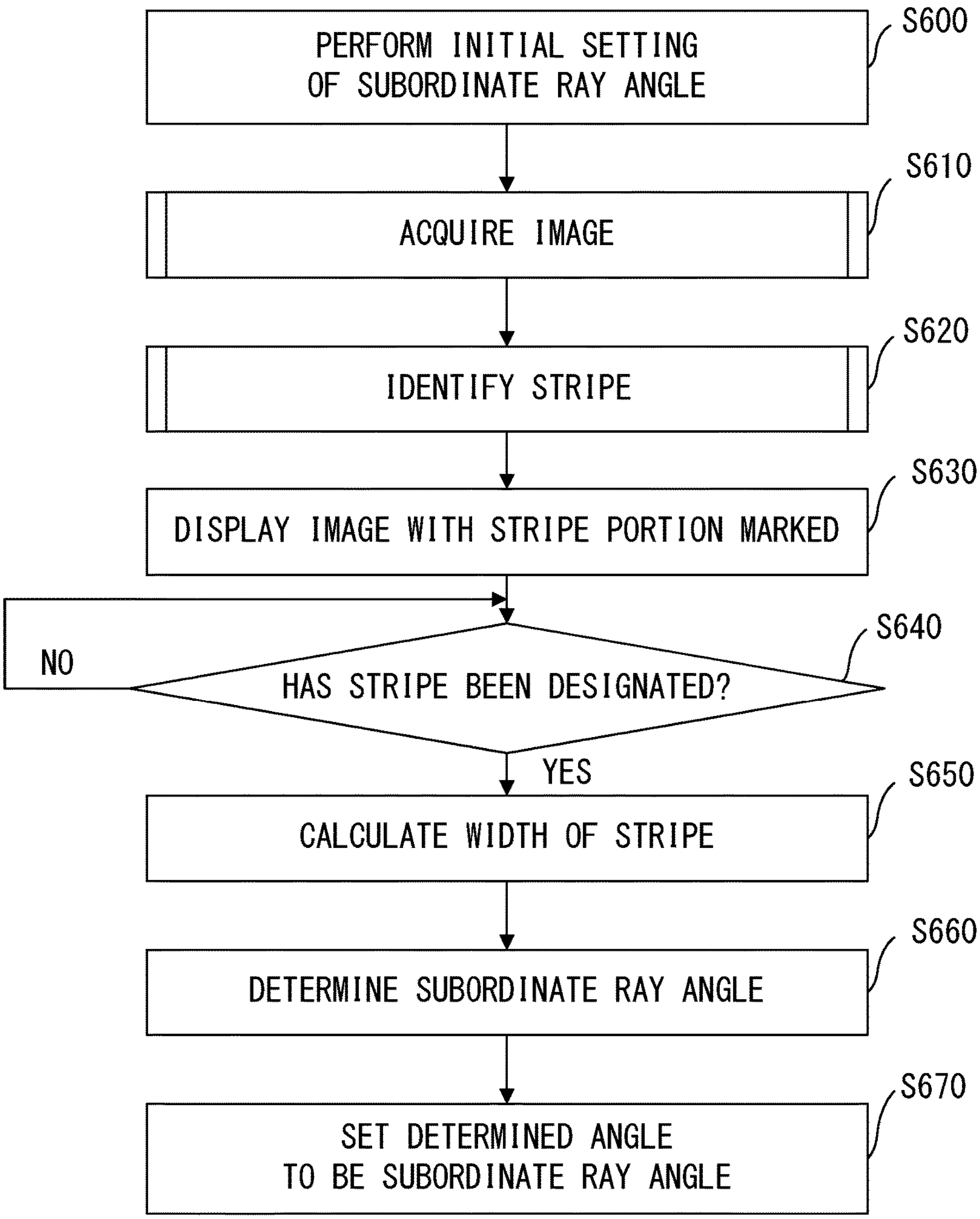
FIG. 21 is a flowchart that illustrates a procedure of illumination setting processing according to the fifth embodiment.

FIG. 21 is a flowchart that illustrates a procedure of illumination setting processing. Referring to FIG. 21, the illumination setting processing performed in the light sheet microscope apparatus according to the present embodiment is described below, focusing on the difference from the illumination setting processing illustrated in FIG. 15.

First, the light sheet microscope apparatus performs an initial setting of a subordinate ray angle of a light sheet emitted from the illumination optical system 10 (Step S600), and acquires an image of the sample S in the initial setting (Step S610). Further, the light sheet microscope apparatus identifies a stripe on the basis of the acquired image (Step S620). Step S600 to Step S620 are similar to Step S400 to Step S420 of FIG. 15.

Figure 22:
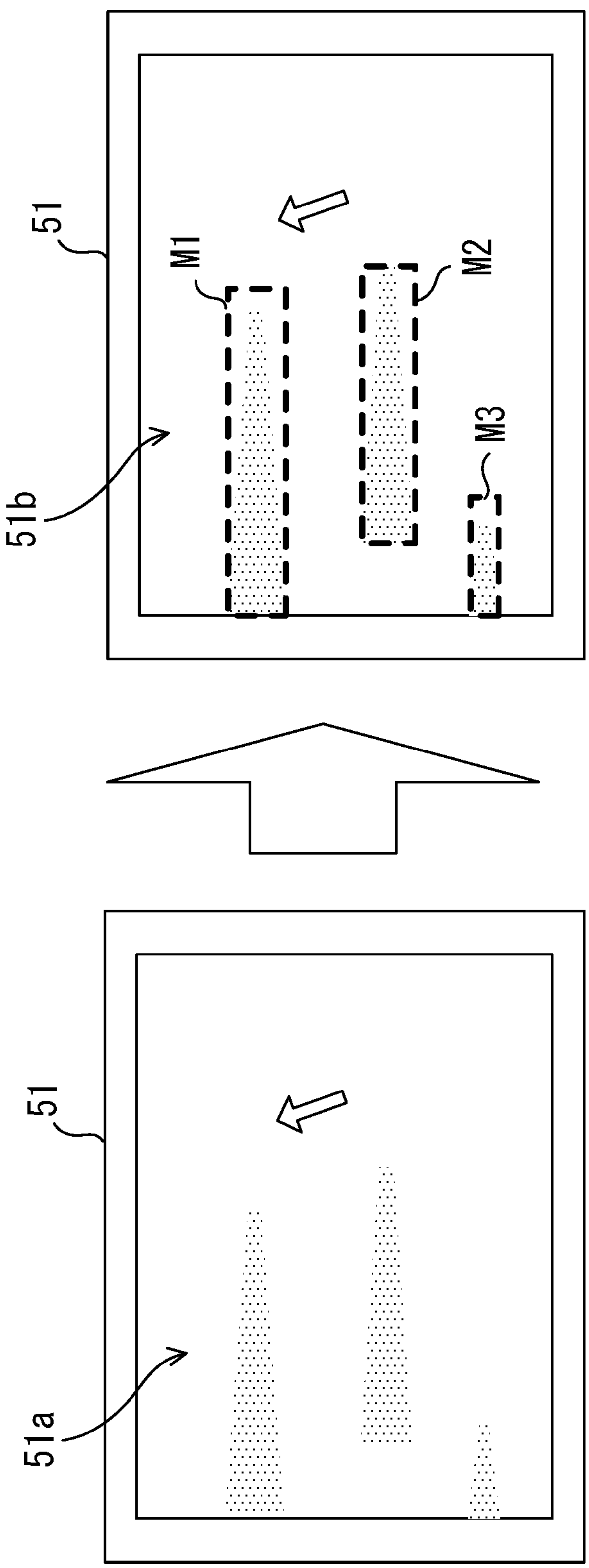
FIG. 22 illustrates an example of a screen displayed during the illumination setting processing according to the fifth embodiment.

When the stripe has been identified, the light sheet microscope apparatus displays an image in which a portion that is the stripe identified in Step S620 has been marked (Step S630). Here, the controller 100 displays, on the display device 51, an image of the sample in which a portion that is the identified stripe has been marked. In other words, the light sheet microscope apparatus displays, on the display device 51, a position of the identified stripe together with the image of the sample. For example, as illustrated in FIG. 22, the controller 100 updates the image that is being displayed on the display device 51 from an image 51*a* of the sample in which stripe portions have not been marked to an image 51*b* of the sample in which the stripe portion have been marked (a mark M1, a mark M2, and a mark M3).

After that, while viewing the image that is being displayed on the display device 51, the observer selects, on a screen, a stripe to be eliminated using the input devices (the keyboard 52 and the mouse 53). The observer may select all of the stripes to be eliminated or may only select a largest stripe among the stripes to be eliminated.

During the image being displayed, the light sheet microscope apparatus determines whether a stripe has been designated by the observer (Step S640). Here, the controller 100 determines whether a stripe has been designated on the basis of a signal from the input devices (the keyboard 52 and the mouse 53).

When a stripe has been determined to be designated, the light sheet microscope apparatus calculates the width of the stripe (Step S650). Here, the controller 100 measures, on the screen, the width of the stripe designated in Step S640 so as to calculate the width of the stripe. When a plurality of stripes have been selected, the width of each of the stripes is calculated.

When the width of the stripe has been calculated, the light sheet microscope apparatus determines the subordinate ray angle (Step S660). Here, the controller 100 determines the subordinate ray angle on the basis of the width of the stripe that has been calculated in Step S650. When the widths of the plurality of stripes have been calculated, it is preferable that the subordinate ray angle be determined on the basis of the width of a largest stripe.

Finally, the light sheet microscope apparatus sets the determined angle to be the subordinate ray angle (Step S670), and terminates the illumination setting processing. Step S670 is similar to Step S450 of FIG. 15. After that, the light sheet microscope apparatus radiates a light sheet onto the sample S in the setting performed in Step S670 and acquires an image of the sample S, the observer observes the sample S.

When the light sheet microscope apparatus performs the illumination setting processing of FIG. 21, the width of a stripe is calculated from an image and a subordinate ray angle is determined on the basis of the width of the stripe. As in the first embodiment, this makes it possible to perform a setting that permits obtaining of a sufficient stripe eliminating effect while suppressing a reduction in illumination performance without making the subordinate ray angle too large. Thus, it is possible to easily perform an appropriate illumination setting for a light sheet illumination. Further, only one image is sufficient, so it is possible to perform an illumination setting in a shorter time and to suppress damage caused to a sample due to an illumination setting, as in the second embodiment. Furthermore, in the present embodiment, a subordinate ray angle is determined such that a stripe eliminating effect is obtained for at least a stripe selected by an observer, and this results in being able to further suppress a reduction in illumination performance while providing a stripe eliminating effect that satisfies the requirements of the observer.

Sixth Embodiment

Figure 23A:
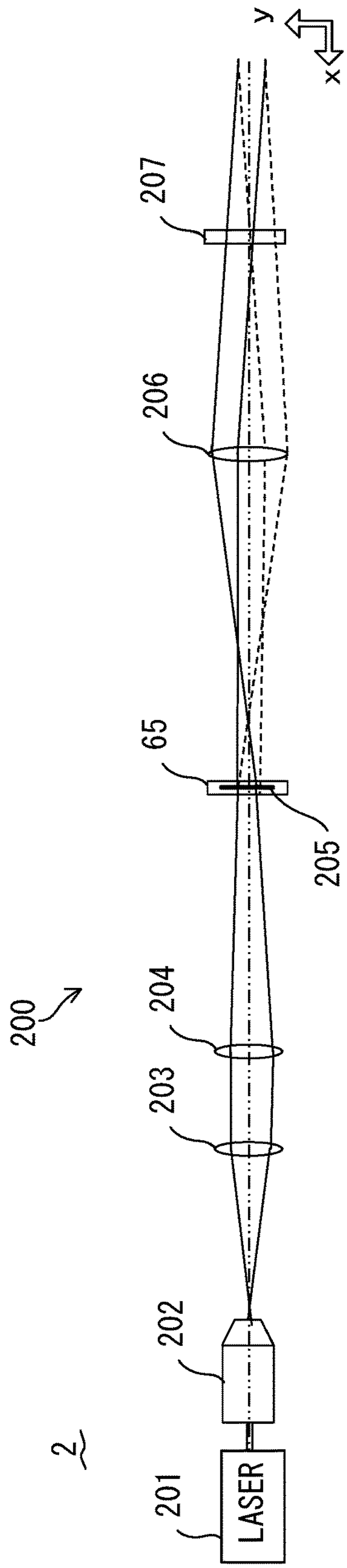
FIG. 23A illustrates a light sheet microscope apparatus according to a sixth embodiment and an illumination beam, as viewed from the thickness direction of a light sheet.
Figure 23B:
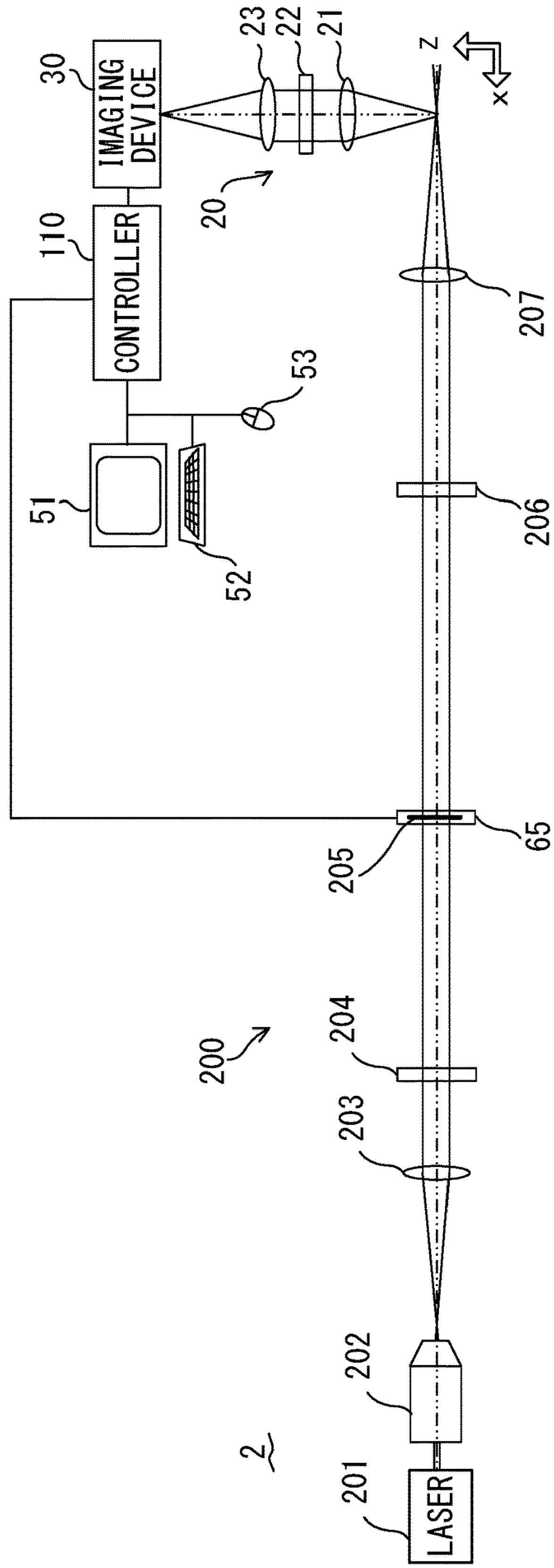
FIG. 23B illustrates the light sheet microscope apparatus according to the sixth embodiment and the illumination beam, as viewed from the width direction of the light sheet.

FIGS. 23A and 23B illustrate a configuration of a light sheet microscope apparatus 2. Like the light sheet microscope apparatus 1, the light sheet microscope apparatus 2 is, for example, a fluorescence microscope that detects a fluorescence from the sample S such as a biological sample, and is configured to illuminate the sample S with a light sheet.

The light sheet microscope apparatus 2 is different from the light sheet microscope apparatus 1 in that it includes an illumination optical system 200 instead of the illumination optical system 10, a controller 110 instead of the controller 40, and a setting device 65 instead of the setting device 60.

The illumination optical system 200 is configured to form a light sheet having a sheet shape substantially perpendicular to the optical axis of the detection optical system 20 and to radiate the light sheet onto the sample S from a direction substantially perpendicular to the optical axis of the detection optical system 20. Compared with the illumination optical system 10, the illumination optical system 200 forms a wider light sheet so that it is possible to illuminate the observation range R at one time.

The illumination optical system 200 includes a laser 201. The laser 201 is a light source that emits a laser beam (illumination light) that will be converted into a light sheet. The illumination optical system 200 further includes, in order from the side of the laser 201, a lens 202, a lens 203, a cylindrical lens 204, a mirror 205, a cylindrical lens 206, and a cylindrical lens 207.

The cylindrical lens 204 and the cylindrical lens 206 are arranged to have a refractive power in the xy plane and to not have a refractive power in the xz plane. The cylindrical lens 207 is arranged to have a refractive power in the xz plane and to not have a refractive power in the xy plane.

The mirror 205 is a rotation mirror that can change the angle with respect to incident light by rotating about the z axis, and the angle of the mirror 205 is changed according to the setting device 65. It is preferable that the mirror 205 be arranged within a pupil plane of the illumination optical system 200.

The controller 110 is a microscope controller that controls the light sheet microscope apparatus 2. The controller 110 is configured to output a control signal to various electrical mechanisms provided in a microscope body of the light sheet microscope apparatus 2, and has, for example, a hardware configuration similar to the controller 40.

The setting device 65 is a device that performs a setting of the illumination optical system 200, and is one of the electrical mechanisms, in the microscope body, which operate according to the control signal from the controller 110. Specifically, the setting device 65 is a driving device, such as a motor, that changes the angle of the mirror 205. The angle of a principal ray of a light sheet emitted from the illumination optical system 200 is changed by the setting device 65 changing the angle of the mirror 205.

In the light sheet microscope apparatus 2 having the configuration described above, the cylindrical lens 204 and the cylindrical lens 206 do not substantially act on a laser beam in the xz plane because they do not have a refractive power in the xz plane. Further, the mirror 205 that rotates about the z axis also does not substantially act on a laser beam in the xz plane. Thus, as illustrated in FIG. 23B, a laser beam is collected into a certain position by the cylindrical lens 207 independent of the angle of the mirror 205, as viewed from the width direction (y-axis direction).

Further, the cylindrical lens 204 and the cylindrical lens 206 have a refractive power in the xy plane. Thus, as illustrated in FIG. 23A, the width of a laser beam is adjusted with a combination of the lens 202 and the lens 203 and is further adjusted with a combination of the cylindrical lens 204 and the cylindrical lens 206, as viewed from the thickness direction (z-axis direction). The cylindrical lens 207 does not have a refractive power in the xy plane, so a laser beam emitted from the cylindrical lens 206 is radiated onto a sample with an unchanged width. However, the direction of the principal ray of the laser beam depends on the angle of the mirror 205.

Thus, according to the light sheet microscope apparatus 2, it is possible to change the direction of a principal ray of a light sheet emitted from the illumination optical system 200 according to the angle of the mirror 205. Therefore, the change in the angle of the mirror 205 makes it possible to change an incident angle at which a principal ray of the light sheet enters a sample. Then, the incident angle is changed during the exposure time period of the imaging device 30 so as to illuminate the sample from various directions, which permits obtaining of a stripe eliminating effect.

Figure 24:
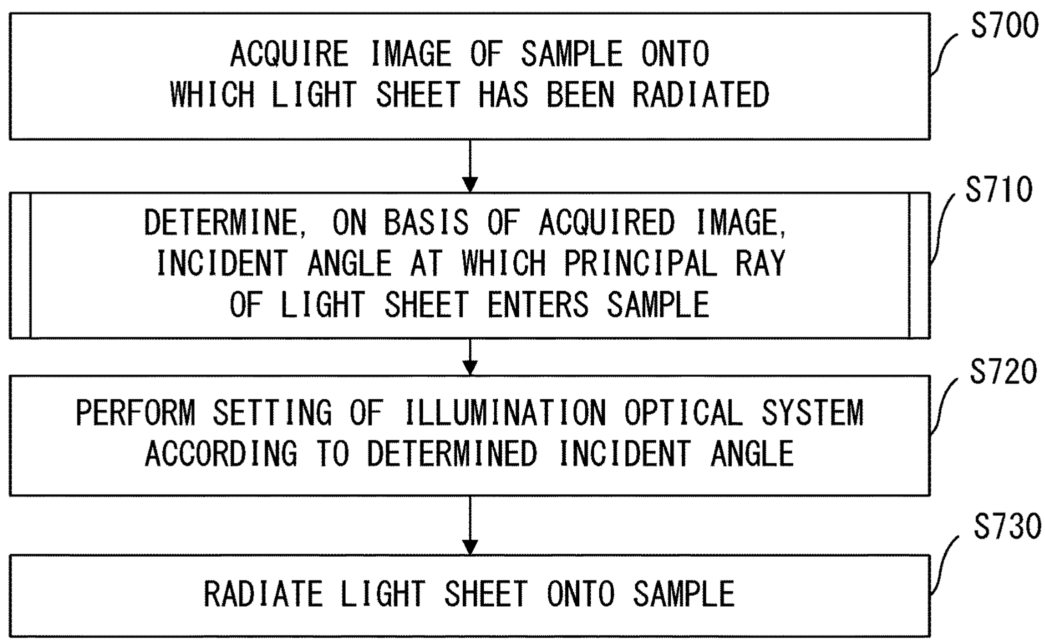
FIG. 24 is a flowchart that illustrates a procedure of illumination setting processing according to the sixth embodiment.
Figure 25:
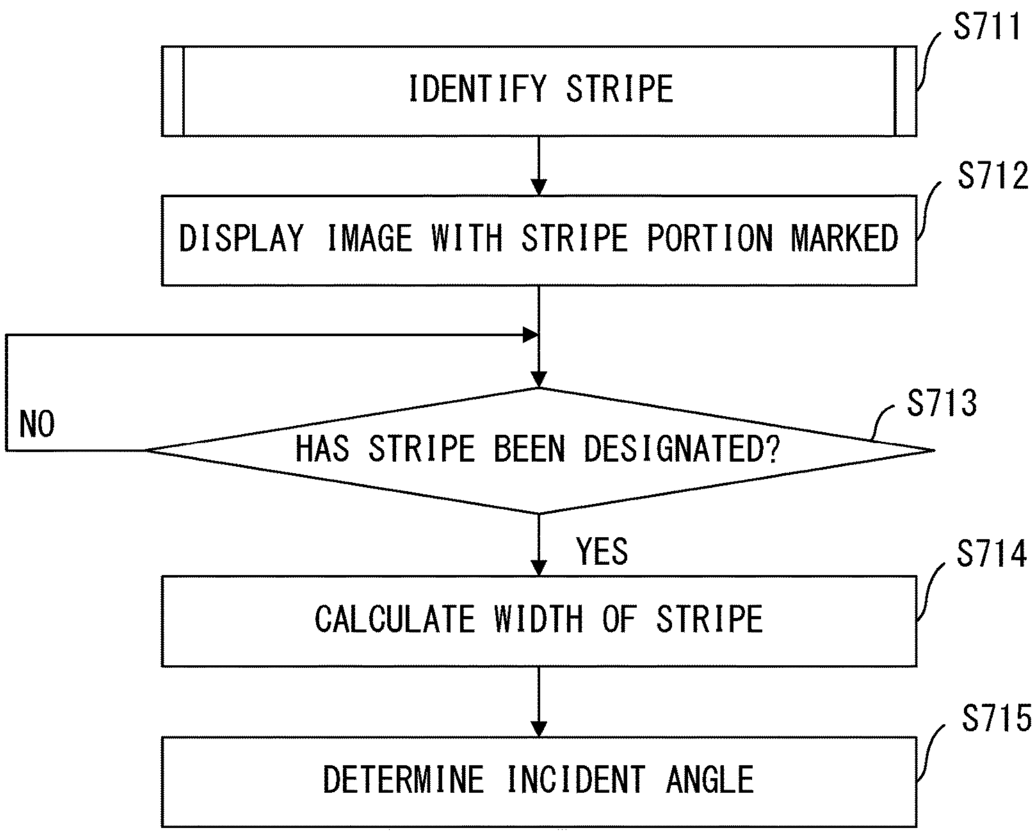
FIG. 25 is a flowchart that illustrates a procedure of incident angle determination processing according to the sixth embodiment.

FIG. 24 is a flowchart that illustrates a procedure of illumination setting processing. FIG. 25 is a flowchart that illustrates a procedure of incident angle determination processing. Referring to FIGS. 24 and 25, the illumination setting processing performed in the light sheet microscope apparatus 2 is specifically described below.

First, the light sheet microscope apparatus 2 acquires an image of the sample S onto which a light sheet emitted from the illumination optical system 200 has been radiated (Step S700). Here, the illumination optical system 200 radiates a light sheet onto the sample S, and the imaging device 30 captures an image of the sample S and generates image data of the sample S. The generated image data of the sample S is output to the controller 110.

Next, on the basis of the acquired image, the light sheet microscope apparatus 2 determines an incident angle at which a principal ray of the light sheet enters the sample (Step S710). Here, the controller 110 performs the incident angle setting processing illustrated in FIG. 25, and determines, on the basis of the image acquired from the imaging device 30, an incident angle at which a principal ray of the light sheet emitted from the illumination optical system 200 enters the sample. Step S711 to Step S714 are similar to Step S620 to Step 650 of FIG. 21. The controller 110 determines the incident angle on the basis of the calculated width of the stripe (Step S715). The incident angle may be geometrically determined, for example, on the basis of the width of the stripe that has been calculated in Step S714 and a preset acceptable length of the stripe.

When the incident angle has been determined, the light sheet microscope apparatus 2 performs a setting of the illumination optical system 200 according to the determined incident angle (Step S720), and radiates a light sheet onto the sample (Step S730). Here, in the light sheet microscope apparatus 2, the setting device 65 radiates a light sheet onto the sample while repeatedly performing a setting of the illumination optical system 200 according to a control signal output from the controller 110. Specifically, the light sheet microscope apparatus 2 radiates a light sheet while changing the incident angle from zero degrees up to the angle determined in Step S710.

Also when the light sheet microscope apparatus 2 performs the illumination setting processing of FIG. 24, it is possible to perform a setting that permits obtaining of a sufficient stripe eliminating effect while suppressing a reduction in illumination performance without making the subordinate ray angle too large. Thus, it is possible to easily perform an appropriate illumination setting for a light sheet illumination.

In the illumination setting processing illustrated in FIG. 24, the example in which the setting of the illumination optical system 200 is performed according to the determined incident angle has been described, but it is sufficient if the incident angle is controlled. Thus, instead of performing the setting of the illumination optical system 200, a setting of a direction of a sample may be performed by rotating, for example, a stage on which the sample is placed. Further, it is sufficient if at least one of these settings is performed, so both the setting of the illumination optical system 200 and the setting of a direction of a sample may be performed.

The embodiments described above are just examples to facilitate understanding of the present invention, and the embodiment of the present invention is not limited to these examples. Various modifications and alterations may be made to an illumination setting method, a light sheet microscope apparatus, and a recording medium without departing from the scope of the invention specified in the claims.

What is claimed is:

1. An illumination setting method comprising:

acquiring an image of a sample onto which a light sheet emitted from an illumination optical system has been radiated;

determining, based on the acquired image of the sample, a subordinate ray angle with respect to a width direction of the light sheet emitted from the illumination optical system, wherein the subordinate ray angle is a maximum angle formed by an optical axis on an exit side of the illumination optical system, and the subordinate ray angle with respect to the width direction is in a cross-section that includes the width direction and a traveling direction of the light sheet; and performing a setting of the illumination optical system according to the determined subordinate ray angle.

2. The illumination setting method according to claim 1, wherein the acquiring of the image of the sample includes:

scanning the sample with the light sheet emitted from the illumination optical system in the width direction of the light sheet, and capturing, by an imaging device, the image of the sample onto which the light sheet emitted from the illumination optical system has been radiated.

3. The illumination setting method according to claim 2, wherein the scanning includes moving the light sheet in a parallel fashion in the width direction while maintaining a direction of a principal ray of the light sheet.

4. The illumination setting method according to claim 1, wherein the determining of the subordinate ray angle includes:

calculating, based on the acquired image of the sample, a width of a stripe that appears in the image of the sample, and determining the subordinate ray angle based on the calculated width of the stripe.

5. The illumination setting method according to claim 4, wherein the determining of the subordinate ray angle further includes identifying the stripe that appears in the acquired image of the sample before calculating the width of the stripe.

6. The illumination setting method according to claim 5, wherein the identifying of the stripe includes identifying, based on the image of the sample, an area in which an intensity of an image signal is not greater than a predetermined value, and identifying the stripe based on the identified area.

7. The illumination setting method according to claim 5, wherein the identifying of the stripe includes comparing a plurality of images of the sample onto which light sheets with different predetermined subordinate ray angles have been radiated, and identifying the stripe based on a result of comparing the plurality of images.

8. The illumination setting method according to claim 5, wherein the identifying of the stripe includes performing pattern matching processing on the image of the sample.

9. The illumination setting method according to claim 5, further comprising, displaying, on a display device, a position of the identified stripe.

10. The illumination setting method according to claim 4, wherein the subordinate ray angle is calculated based on the calculated width of the stripe and an acceptable length of the stripe.

11. The illumination setting method according to claim 1, wherein:

the acquiring of the image of the sample includes acquiring a plurality of images of the sample, each of the plurality of images is an image of the sample onto which a light sheet with a different subordinate ray angle has been radiated, the determining of the subordinate ray angle includes comparing the acquired plurality of images, and the subordinate ray angle is determined based on a result of comparing the plurality of images.

12. The illumination setting method according to claim 11, wherein:

the determining of the subordinate ray angle further includes identifying a stripe that appears in each of the plurality of images of the sample before comparing the plurality of images, the comparing of the plurality of images includes comparing small regions, in the plurality of images, that each include the identified stripe, and the subordinate ray angle is determined based on a result of comparing the small regions in the plurality of images.

13. An illumination setting method comprising:

acquiring, by a computer and from an imaging device, an image of a sample onto which a light sheet has been radiated by an illumination optical system;

determining, by the computer and based on the image of the sample that has been acquired from the imaging device, a subordinate ray angle with respect to a width direction of the light sheet emitted from the illumination optical system, wherein the subordinate ray angle is a maximum angle formed by an optical axis on an exit side of the illumination optical system, and the subordinate ray angle with respect to the width direction is in a cross-section that includes the width direction and a traveling direction of the light sheet; and outputting, by the computer, a control signal that gives an instruction to perform a setting of the illumination optical system that corresponds to the determined subordinate ray angle.

14. A light sheet microscope apparatus comprising:

an illumination optical system that radiates a light sheet onto a sample;

an imaging device that acquires an image of the sample onto which the light sheet has been radiated by the illumination optical system;

a controller that determines, based on the image of the sample that has been acquired by the imaging device, a subordinate ray angle with respect to a width direction of the light sheet emitted from the illumination optical system, wherein the subordinate ray angle is a maximum angle formed by an optical axis on an exit side of the illumination optical system, and the subordinate ray angle with respect to the width direction is in a cross-section that includes the width direction and a traveling direction of the light sheet; and a setting device that performs a setting of the illumination optical system according to the subordinate ray angle determined by the controller.

15. The light sheet microscope apparatus according to claim 14, wherein the illumination optical system includes:

a scanner that scans the sample with the light sheet in the width direction of the light sheet, and a scanning optical system that is arranged such that the scanner is situated at a front focal position of the scanning optical system in the width direction of the light sheet and that radiates light deflected by the scanner onto the sample.

16. The light sheet microscope apparatus according to claim 14, wherein the controller includes a circuit, and the circuit is configured to:

calculate, based on the image of the sample that has been acquired by the imaging device, a width of a stripe that appears in the image of the sample, determine the subordinate ray angle based on the calculated width of the stripe, and output, to the setting device, a control signal that gives an instruction to perform a setting of the illumination optical system that corresponds to the determined subordinate ray angle.

17. The light sheet microscope apparatus according to claim 14, wherein the controller includes a circuit, and the circuit is configured to:

compare a plurality of images of the sample that have been acquired by the imaging device, each of the plurality of images being an image of the sample onto which a light sheet with a different subordinate ray angle has been radiated, determine the subordinate ray angle based on a result of the comparison, and output, to the setting device, a control signal that gives an instruction to perform a setting of the illumination optical system that corresponds to the determined subordinate ray angle.

18. A non-transitory recording medium having stored therein a program that causes a computer to execute a process comprising:

acquiring, from an imaging device, an image of a sample onto which a light sheet has been radiated by an illumination optical system;

determining, based on the image of the sample that has been acquired from the imaging device, a subordinate ray angle with respect to a width direction of the light sheet emitted from the illumination optical system, wherein the subordinate ray angle is a maximum angle formed by an optical axis on an exit side of the illumination optical system, and the subordinate ray angle with respect to the width direction is in a cross-section that includes the width direction and a traveling direction of the light sheet; and outputting a control signal that gives an instruction to perform a setting of the illumination optical system that corresponds to the determined subordinate ray angle.

* * * * *